US009233812B2

(12) United States Patent

Martin et al.

(10) Patent No.: US 9,233,812 B2

(45) Date of Patent: Jan. 12, 2016

(54) CARD DISPENSING APPARATUSES AND ASSOCIATED METHODS OF OPERATION

(75) Inventors: Douglas A. Martin, Woodinville, WA (US); Gregory P. Winters, Snohomish, WA (US)

(73) Assignee: Outerwall Inc., Bellevue, WA (US)

( * ) Notice: Subject to any disclaimer, the term of this patent is extended or adjusted under 35 U.S.C. 154(b) by 1012 days.

(21) Appl. No.: 12/940,541

(22) Filed: Nov. 5, 2010

(65) Prior Publication Data

US 2011/0071666 A1 Mar. 24, 2011

Related U.S. Application Data

(63) Continuation-in-part of application No. 12/795,799, filed on Jun. 8, 2010, now Pat. No. 8,038,059, which is a continuation of application No. 11/294,652, filed on Dec. 5, 2005, now Pat. No. 7,748,619.

(51) Int. Cl.
*G06F 7/08* (2006.01)
*B65H 7/20* (2006.01)
(Continued)

(52) U.S. Cl.
CPC .. *B65H 7/20* (2013.01); *B65H 1/28* (2013.01); *B65H 3/0816* (2013.01);
(Continued)

(58) Field of Classification Search
CPC .......... B65H 7/20; B65H 3/0816; B65H 7/02; B65H 3/0883; B65H 3/44; B65H 1/28; B65H 2701/1914; B65H 2511/152; B65H 2511/22; B65H 2405/1117; B65H 2553/51; B65H 2701/1125; G07F 11/14; G07F 11/04
USPC ........................ 235/375, 381, 379, 487, 492; 271/10.03; 221/11, 211
See application file for complete search history.

(56) References Cited

U.S. PATENT DOCUMENTS 3,655,092 A 4/1972 Hall et al.
3,757,917 A 9/1973 Waiwood et al.
(Continued)

FOREIGN PATENT DOCUMENTS

DE 3147603 6/1983
EP 0313294 4/1989
(Continued)

OTHER PUBLICATIONS

Examiner's Report #2 for Australian Application No. 2006323072, Mail Date Nov. 16, 2009, 2 pages.
(Continued)

*Primary Examiner* — Sonji Johnson
(74) *Attorney, Agent, or Firm* — Perkins Coie LLP

(57) ABSTRACT

Apparatuses and methods for dispensing magnetic stripe cards, smart cards, other cards, and/or other items from kiosks and other structures are disclosed herein. In one embodiment, a card dispensing apparatus includes at least a first card hopper and a card transport assembly. The first card hopper is configured to hold a stack of cards that includes at least a first card stacked on a second card. The card transport assembly includes a card carrier configured to lift the first card off the second card and transfer the first card toward a card outlet. Methods are also disclosed for monitoring card stacks in a card dispensing apparatus and for prereading cards prior to sale to expedite dispensing operations. Devices are also disclosed for maintaining the alignment or levelness of top cards in stacks of cards having embossing or other raised features that cause uneven stacking.

19 Claims, 18 Drawing Sheets

(51) Int. Cl.

| | |
|---|---|
| ***B65H 1/28*** | (2006.01) |
| ***B65H 3/08*** | (2006.01) |
| ***B65H 3/44*** | (2006.01) |
| ***B65H 7/02*** | (2006.01) |
| ***G07F 11/04*** | (2006.01) |
| ***G07F 11/14*** | (2006.01) |

(52) U.S. Cl.

CPC ............... *B65H 3/0883* (2013.01); *B65H 3/44* (2013.01); *B65H 7/02* (2013.01); *G07F 11/04* (2013.01); *G07F 11/14* (2013.01); *B65H 2405/1117* (2013.01); *B65H 2511/152* (2013.01); *B65H 2511/22* (2013.01); *B65H 2553/51* (2013.01); *B65H 2701/1125* (2013.01); *B65H 2701/1914* (2013.01)

(56) References Cited

U.S. PATENT DOCUMENTS

| | | | | |
|---|---|---|---|---|
| 3,947,118 | A * | 3/1976 | Amort | 355/77 |
| 4,252,250 | A | 2/1981 | Toth | |
| 4,322,067 | A | 3/1982 | Masselin et al. | |
| 4,687,119 | A | 8/1987 | Juillet | |
| 4,825,054 | A | 4/1989 | Rust et al. | |
| 5,010,997 | A | 4/1991 | Matsuo et al. | |
| 5,106,260 | A | 4/1992 | Obrecht | |
| 5,176,237 | A | 1/1993 | Yang | |
| 5,271,628 | A | 12/1993 | Okada | |
| 5,350,906 | A | 9/1994 | Brody et al. | |
| 5,365,046 | A | 11/1994 | Haymann | |
| 5,368,286 | A | 11/1994 | Horsman et al. | |
| 5,457,305 | A | 10/1995 | Akel et al. | |
| 5,531,640 | A | 7/1996 | Inoue | |
| 5,555,497 | A | 9/1996 | Helbling | |
| 5,564,546 | A | 10/1996 | Molbak et al. | |
| 5,577,959 | A | 11/1996 | Takemoto et al. | |
| 5,584,589 | A | 12/1996 | Adkins et al. | |
| 5,637,845 | A | 6/1997 | Kolls | |
| 5,665,952 | A | 9/1997 | Ziarno | |
| 5,699,328 | A | 12/1997 | Ishizaki et al. | |
| 5,743,429 | A | 4/1998 | Morofsky | |
| 5,746,299 | A | 5/1998 | Molbak et al. | |
| 5,799,767 | A | 9/1998 | Molbak | |
| 5,839,956 | A | 11/1998 | Takemoto et al. | |
| 5,857,588 | A | 1/1999 | Kasper | |
| 5,949,046 | A | 9/1999 | Kenneth et al. | |
| 5,974,146 | A | 10/1999 | Randle et al. | |
| 6,039,412 | A * | 3/2000 | Kazo et al. | 235/437 |
| 6,102,248 | A | 8/2000 | Yamamiya | |
| 6,105,009 | A | 8/2000 | Cuervo | |
| 6,116,402 | A | 9/2000 | Beach et al. | |
| 6,129,275 | A | 10/2000 | Urquhart et al. | |
| 6,138,106 | A | 10/2000 | Walker et al. | |
| 6,144,946 | A | 11/2000 | Iwamura et al. | |
| 6,149,064 | A | 11/2000 | Yamaoka et al. | |
| 6,185,545 | B1 | 2/2001 | Resnick et al. | |
| 6,230,928 | B1 | 5/2001 | Hanna et al. | |
| 6,233,564 | B1 | 5/2001 | Schulze, Jr. | |
| 6,253,955 | B1 | 7/2001 | Bower | |
| 6,289,324 | B1 | 9/2001 | Kawan | |
| 6,318,536 | B1 | 11/2001 | Korman et al. | |
| 6,405,182 | B1 | 6/2002 | Cuervo | |
| 6,415,262 | B1 | 7/2002 | Walker et al. | |
| 6,494,365 | B1 | 12/2002 | Kozakai et al. | |
| 6,494,776 | B1 | 12/2002 | Molbak | |
| 6,527,139 | B2 | 3/2003 | Seagle | |
| 6,597,970 | B1 | 7/2003 | Steury et al. | |
| 6,659,259 | B2 | 12/2003 | Knox et al. | |
| 6,786,355 | B2 | 9/2004 | Chirnomas | |
| 6,805,286 | B2 | 10/2004 | Hilton et al. | |
| 6,957,746 | B2 | 10/2005 | Martin et al. | |
| 7,044,330 | B2 | 5/2006 | Chirnomas | |
| 7,044,332 | B2 | 5/2006 | Giegerich et al. | |
| 7,128,261 | B1 | 10/2006 | Henderson et al. | |
| 7,156,300 | B1 | 1/2007 | Dentlinger | |
| 7,255,268 | B2 | 8/2007 | Dentlinger | |
| 7,377,507 | B2 | 5/2008 | Yamamiya | |
| 7,520,374 | B2 | 4/2009 | Martin et al. | |
| 7,653,599 | B2 | 1/2010 | Doran et al. | |
| 7,677,565 | B2 | 3/2010 | Grauzer et al. | |
| 7,685,432 | B2 | 3/2010 | Mochizuki | |
| 7,748,619 | B2 | 7/2010 | Martin et al. | |
| 7,815,071 | B2 | 10/2010 | Martin et al. | |
| 7,865,432 | B2 | 1/2011 | Doran et al. | |
| 7,874,478 | B2 | 1/2011 | Molbak | |
| 7,967,191 | B1 * | 6/2011 | Enright et al. | 235/379 |
| 8,028,989 | B2 | 10/2011 | Kitagawa et al. | |
| 8,033,375 | B2 | 10/2011 | Doran et al. | |
| 8,038,059 | B2 | 10/2011 | Martin et al. | |
| 8,131,398 | B2 | 3/2012 | Fan et al. | |
| 8,332,313 | B2 | 12/2012 | Doran et al. | |
| 8,550,294 | B2 | 10/2013 | Martin | |
| 2001/0050288 | A1 | 12/2001 | Seagle | |
| 2002/0026423 | A1 | 2/2002 | Maritzen et al. | |
| 2003/0010827 | A1 * | 1/2003 | Hilton et al. | 235/475 |
| 2003/0094463 | A1 | 5/2003 | Chirnomas | |
| 2003/0141315 | A1 | 7/2003 | Chirnomas | |
| 2003/0155370 | A1 * | 8/2003 | Martin et al. | 221/123 |
| 2004/0067789 | A1 | 4/2004 | Grauzer et al. | |
| 2004/0079615 | A1 * | 4/2004 | Furneaux | 194/215 |
| 2005/0139606 | A1 | 6/2005 | Martin et al. | |
| 2006/0207856 | A1 | 9/2006 | Dean et al. | |
| 2007/0069462 | A1 * | 3/2007 | Downs et al. | 273/149 R |
| 2007/0125620 | A1 | 6/2007 | Sorenson et al. | |
| 2007/0125845 | A1 | 6/2007 | Martin et al. | |
| 2007/0176349 | A1 * | 8/2007 | Gerlier et al. | 271/10.03 |
| 2008/0162299 | A1 | 7/2008 | Gusler et al. | |
| 2008/0164279 | A1 | 7/2008 | Chirnomas et al. | |
| 2008/0203157 | A1 * | 8/2008 | Thorsen et al. | 235/382 |
| 2009/0045255 | A1 | 2/2009 | Adams | |
| 2011/0007166 | A1 | 1/2011 | Forestier et al. | |
| 2011/0042403 | A1 | 2/2011 | Martin | |
| 2013/0086973 | A1 | 4/2013 | Martin et al. | |
| 2014/0263385 | A1 | 9/2014 | Martin | |

FOREIGN PATENT DOCUMENTS

| | | | |
|---|---|---|---|
| EP | 0857579 | A2 | 8/1998 |
| EP | 1178448 | | 2/2002 |
| GB | 2188467 | | 9/1987 |
| JP | 1246698 | A | 10/1989 |
| JP | 3-63795 | | 3/1991 |
| JP | 2000094871 | | 4/2000 |
| WO | WO-9950785 | | 10/1999 |

OTHER PUBLICATIONS

Final Office Action for U.S. Appl. No. 12/795,799, Mail Date Jan. 26, 2011, 24 pages.

Examination Report for Canadian Application No. CA 2,630,247, Mail Date Feb. 1, 2011, 6 pages.

U.S. Appl. No. 12/795,799, filed Jun. 8, 2010, Martin et al.

U.S. Appl. No. 12/877,261, filed Sep. 8, 2010, Martin et al.

Examiner's Report for Australian Application No. 2006323072, Mail Date Sep. 10, 2009, 2 pages.

Examiner's Report for Canadian Application No. 2,630,247, Mail Date Jan. 5, 2010, 3 pages.

International Search Report and Written Opinion, International Application No. PCT/US06/45275, Mar. 25, 2008, 13 pages.

Notice of Allowance for U.S. Appl. No. 11/294,652, Mail Date Feb. 24, 2010, 28 pages.

Sheehan, Michael, "Marriage of Convenience," http://www.kioskbusiness.com/NovDec01/articles/article4.html [accessed May 16, 2003], 3 pages.

Tranax Technologies, Inc., "Card Dispenser," 2007,<http://www.tranax.com/products/self-service_products/accessories/index.cfm?product=carddisp>, [internet accessed on Aug. 11, 2009], 1 page.

Final Office Action for U.S. Appl. No. 12/877,261, Mail Date Oct. 11, 2011 25 pages.

(56) References Cited

OTHER PUBLICATIONS

Examiner's Report for Canadian Application No. 272173, Mail Date Dec. 27, 2013, 2 pages.
Extended European Search Report for Application No. EP11153058.0, Mail Date May 29, 2012, 11 pages.
Non-Final Office Action for U.S. Appl. No. 12/795,799, Mail Date Sep. 30, 2010, 19 pages.
Partial European Search Report for Application No. EP11153058.0, Mail Date Feb. 6, 2012, 6 pages.
Supplementary European Search Report for Application No. EP06844531.1, Mail Date Dec. 7, 2011, 7 pages.
Final Office Action for U.S. Appl. No. 10/995,032, Mail Date Apr. 28, 2009, 17 pages.
International Search Report, International Application No. PCT/US03/04600, dated Jun. 23, 2003.
International Search Report, International Application No. PCT/US03/04601, dated Aug. 19, 2003.
International Search Report, International Application No. PCT/US03/04603, dated Oct. 6, 2003, 4 pages.
International Search Report, International Application No. PCT/US03/04799, dated Jul. 4, 2003.
International Search Report, International Application No. PCT/US03/11648, dated Nov. 10, 2003, 4 pages.
International Search Report, International Application No. PCT/US98/22534, dated Jan. 26, 1999.
Non-Final Office Action; U.S. Appl. No. 10/367,110; Mailed on May 11, 2004; 6 pgs.
Non-Final Office Action; U.S. Appl. No. 12/877,261; Mailed on May 2, 2011; 21 pgs.
Notice of Allowance; U.S. Appl. No. 10/367,110; Mailed on Oct. 28, 2004; 5 pgs.
Written Opinion, International Application No. PCT/US06/45275, dated Mar. 25, 2008, 7 pages.

* cited by examiner

CARD DISPENSING APPARATUSES AND ASSOCIATED METHODS OF OPERATION

CROSS-REFERENCE TO RELATED APPLICATIONS INCORPORATED BY REFERENCE

The present application is a continuation-in-part of U.S. patent application Ser. No. 12/795,799, filed Jun. 8, 2010, now U.S. Pat. No. 8,038,059 which is a continuation of U.S. patent application Ser. No. 11/294,652, filed Dec. 5, 2005, now U.S. Pat. No. 7,748,619 both of which are incorporated herein by reference in the entirety.

TECHNICAL FIELD

The following disclosure relates generally to apparatuses and methods for dispensing wallet-sized cards and other items from kiosks and other structures.

BACKGROUND

There are various types of vending machines and kiosks for dispensing prepaid credit cards, debit cards, phone cards, and other types of cards to customers. Such machines typically include a user interface for selecting a card, a monetary input device (e.g., a credit card reader or bill acceptor) for receiving payment, and an outlet for dispensing the card to the customer. In use, the customer selects a desired card with the user interface and deposits the required funds via the bill acceptor or credit card reader. Once the machine has confirmed the funds, a card dispenser housed within the machine dispenses the desired card to the consumer via the card outlet.

FIG. 1 is an isometric view of a card dispenser 100 configured in accordance with the prior art. The card dispenser 100 includes a card hopper 102 containing a plurality of cards 101, a card conveyor 104, a card reader 106, and a card outlet 108. In a typical vending machine application, the card dispenser 100 is housed within the machine so that only the card outlet 108 is exposed. In operation, after a user has selected a card and deposited the required funds, the card conveyor 104 removes the bottom-most card 101 from the hopper 102 and moves the card forward past the card reader 106.

As the card moves past the card reader 106, the card reader 106 reads information off a magnetic stripe on the card. The magnetic stripe can include one or more "tracks" of information. The information can include a unique code for associating the card with a particular account. For example, if the card is a prepaid credit card, then the code can be associated with a specific credit card account. Similarly, if the card is a prepaid phone card, then the code can be associated with a specific long-distance account. After moving past the card reader 106, the card conveyor 104 pushes the card through the card outlet 108 to be picked up by the user.

One shortcoming of the prior art card dispenser 100 is that it can only dispense a single type of card. As a result, additional card dispensers are required if more than one type of card is to be dispensed from a particular vending machine. Adding additional card dispensers, however, increases the cost, size, and weight of the vending machine. In addition, multiple card dispensers can increase the risk of card theft through the additional card outlets.

Another shortcoming of the prior art card dispenser 100 is that the card conveyor 104 removes cards from the bottom of the stack. This action can require substantial force when the card hopper 102 is full, and can lead to jams and other malfunctions during card dispensing. A further shortcoming of this design is that it is often difficult for the card reader 106 to read multiple card tracks in a single pass because of card misalignment and other factors. This leads to rejection of cards that would otherwise be usable if properly read.

SUMMARY

Aspects of the present invention are directed to apparatuses and methods for dispensing prepaid credit cards, phone cards, gift cards, stored-value cards, and other similar items from kiosks and other structures. An apparatus for dispensing wallet-sized cards from a kiosk in accordance with one aspect of the invention includes at least a first hopper portion and a card transport assembly positioned relative to the first hopper portion. The first hopper portion can be configured to hold a first stack of cards including at least a first card positioned on a second card. The card transport assembly can be configured to lift the first card off the second card, move the first card away from the first hopper portion and release the first card toward a card outlet.

A method for dispensing at least first and second card types from an enclosure in accordance with another aspect of the invention includes placing a first plurality of cards at a first location within the enclosure, and placing a second plurality of cards at a second location within the enclosure. The first plurality of cards can include at least a first card of the first type positioned on a second card of the first type. Similarly, the second plurality of cards can include at least a third card of the second type positioned on a fourth card of the second type. In response to receiving a first request for a card of the first type, the method can further include lifting the first card off of the second card and transferring the first card toward a card outlet. In response to receiving a second request for a card of the second type, the method can additionally include lifting the third card off of the fourth card and transferring the third card toward the card outlet. In one embodiment, the method can further include moving the first card past a card reader after lifting the first card off the second card.

DETAILED DESCRIPTION

Figure 1:
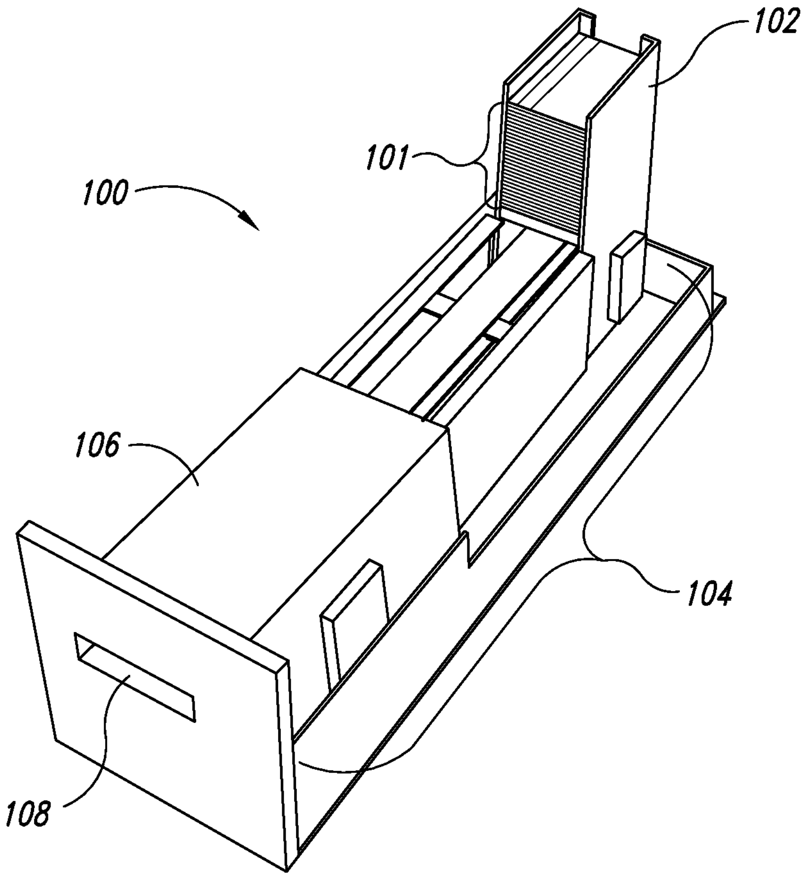
Fig. 1 (Prior Art)
FIG. 1 is an isometric view of a card dispenser configured in accordance with the prior art.

The following disclosure describes systems, apparatuses and methods for dispensing various types of cards (e.g., prepaid credit cards, debit cards, phone cards, etc.) and/or other items from vending machines, kiosks, and/or other structures. The systems, apparatuses and methods disclosed herein can include various features for reading information from, and for writing information to, various types of media. Such media can include, for example, magnetic media complying with one or more International Standards Organization (ISO) standards, memory chips embedded in integrated circuit (IC) cards, bar codes, radio frequency tags, optical media, etc. The systems, apparatuses and methods disclosed herein can also include various features described in U.S. patent application Ser. No. 10/367,110, filed Feb. 14, 2003 and entitled "APPARATUSES AND METHODS FOR DISPENSING MAGNETIC CARDS, INTEGRATED CIRCUIT CARDS, AND OTHER SIMILAR ITEMS," which is incorporated into the present application in its entirety by reference.

Certain embodiments of the apparatuses and methods described herein are described in the context of computer-executable instructions performed by a general-purpose computer. In one embodiment, these computer-executable instructions can be stored on a computer-readable medium, such as a floppy disk or CD-ROM. In other embodiments, these instructions can be stored on a server computer system and accessed via a communications link or a computer network, such as an intranet, the Internet, or other computer network. Because the basic structures and functions related to computer-readable routines and corresponding implementations are known, they have not been shown or described in detail here to avoid unnecessarily obscuring the described embodiments.

Certain specific details are set forth in the following description and in FIGS. 2-15C to provide a thorough understanding of various embodiments of the invention. Those of ordinary skill in the relevant art will understand, however, that the invention can have additional embodiments that may be practiced without several of the details described below. In addition, some well-known structures and systems often associated with card dispensing apparatuses and methods have not been shown or described in detail below to avoid unnecessarily obscuring the description of the various embodiments of the invention.

In the drawings, identical reference numbers identify identical or at least generally similar elements. To facilitate the discussion of any particular element, the most significant digit or digits in any reference number refers to the figure in which that element is first introduced. For example, element 210 is first introduced and discussed with reference to FIG. 2. Any dimensions, angles, and other specifications shown in the figures are merely illustrative of particular embodiments of the invention. Accordingly, other embodiments of the invention can have other dimensions, angles, and specifications without departing from the spirit or scope of the present disclosure.

Figure 2:
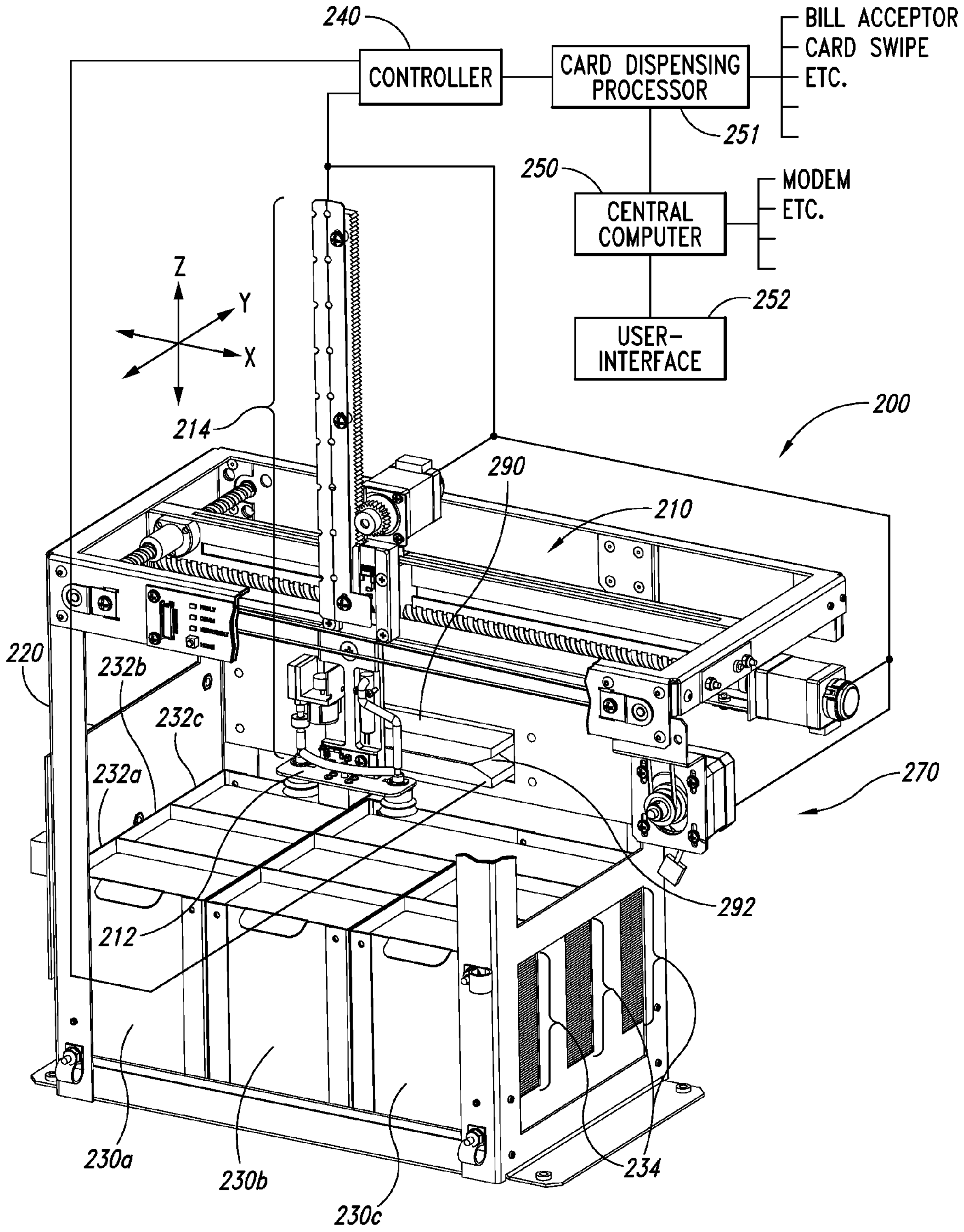
FIG. 2 is a partially schematic isometric view of a card dispensing apparatus configured in accordance with an embodiment of the invention.

FIG. 2 is a partially schematic isometric view of a card dispensing apparatus 200 configured in accordance with an embodiment of the invention. In one aspect of this embodiment, the card dispensing apparatus 200 includes a plurality of hopper trays 230 (identified individually as hopper trays 230*a-c*) positioned toward a bottom portion of a chassis 220. Each of the hopper trays 230 carries a plurality of individual card hoppers 232 (identified individually as card hoppers 232*a-c*). Each of the card hoppers 232 is configured to hold a stack (e.g., a vertical stack) of wallet-sized cards 234 (e.g., credit cards, debit cards, in-store cards, gift cards, on-line cards, phone cards, etc.). In the illustrated embodiment, each hopper tray 230 carries three separate card hoppers 232, giving the card dispensing apparatus 200 a total capacity of nine card hoppers. In other embodiments, however, other card dispensing apparatuses configured in accordance with the present invention can include more or fewer card hoppers.

In another aspect of this embodiment, the card dispensing apparatus 200 further includes a card transport assembly 210 carried by an upper portion of the chassis 220. The card transport assembly 210 includes a movable card carrier 214 having a selector head 212. As described in greater detail below, the card carrier 214 is configured to move back and forth along X and Y axes to position the selector head 212 over a desired card. Once in position, the card carrier 214 moves downwardly along a Z axis until the selector head 212 contacts the card. The selector head 212 then attaches itself to the card, and the card carrier 214 lifts the card out of the respective card hopper 232. The card carrier 214 then transfers the card to a release location 270 and drops it into a card outlet chute (not shown).

In a further aspect of this embodiment, the card dispensing apparatus 200 also includes a card reader 290 mounted toward a side portion of the chassis 220. As described in greater detail below, the card carrier 214 is configured to swipe individual cards through a slot 292 on the card reader 290 as it carries the cards toward the release location 270. In the illustrated embodiment, the card reader 290 includes a read head (not shown in detail) configured to read information off of the cards 234 (e.g., off of one or more tracks of a magnetic stripe, bar code, etc. on the card). In other embodiments, however, the card reader 290 can also include a write head configured to write information to the cards 234 (e.g., to a memory chip, magnetic stripe, etc. on the card) as the cards 234 pass through the slot 292. In one embodiment, the card reader 290 can be an ISO ANSI and AAMVA compatible Magstripe Swipe Card Reader (e.g., part number 21045034) from MagTek, Inc. of 20725 South Annalee Avenue, Carson, Calif. 90746. Such a device has bi-directional read capability and can read up to one million passes with ISO-conforming cards. In other embodiments, however, other types of suitable card readers known in the art can be used with the card dispensing apparatus 200. In a further embodiment, the card reader 290 can be omitted and the card dispensing apparatus 200 can be configured to dispense cards without reading them first.

In yet another aspect of this embodiment, the card transport assembly 210 and the card reader 290 are operatively connected to a controller 240 (shown schematically in FIG. 2). The controller 240 controls movement of the card carrier 214 in response to signals from a "data funnel" or processor 251 and/or the card reader 290. In addition, in those embodiments in which the card reader 290 includes writing capability, the controller 240 can transfer information from the processor 251 to the card reader 290 for writing onto a particular card.

The processor 251 transmits control signals to, and exchanges data with, the controller 240 in response to signals received from a central computer 250 and/or one or more payment devices (e.g., a bill acceptor, coin counter, credit or debit card reader, etc.). In the illustrated embodiment, the central computer 250 controls the overall functions of the particular vending machine, kiosk, or other structure in which the card dispensing apparatus 200 is housed. In this regard, the central computer 250 can receive user instructions, such as card selections and/or payment choices, via a user interface 252 (shown schematically in FIG. 2). As explained in greater detail below, the user interface 252 can include key pads, display screens, touch screens, selector buttons, and/or other suitable input devices known in the art. In this embodiment, the central computer 250 can also enable modem connections to remote computers in a computer network. Such connections can facilitate the exchange of data, such as card purchase and/or card account data, with one or more remote computers.

As those of ordinary skill in the art will appreciate, the present invention is not limited to the foregoing arrangement of processors and controllers. For example, in another embodiment, the card dispensing processor 251 can be omitted. In this embodiment, the central computer 250 can transmit control signals directly to, and exchange data directly with, the controller 240 for control of the card dispensing apparatus 200.

Figure 3:
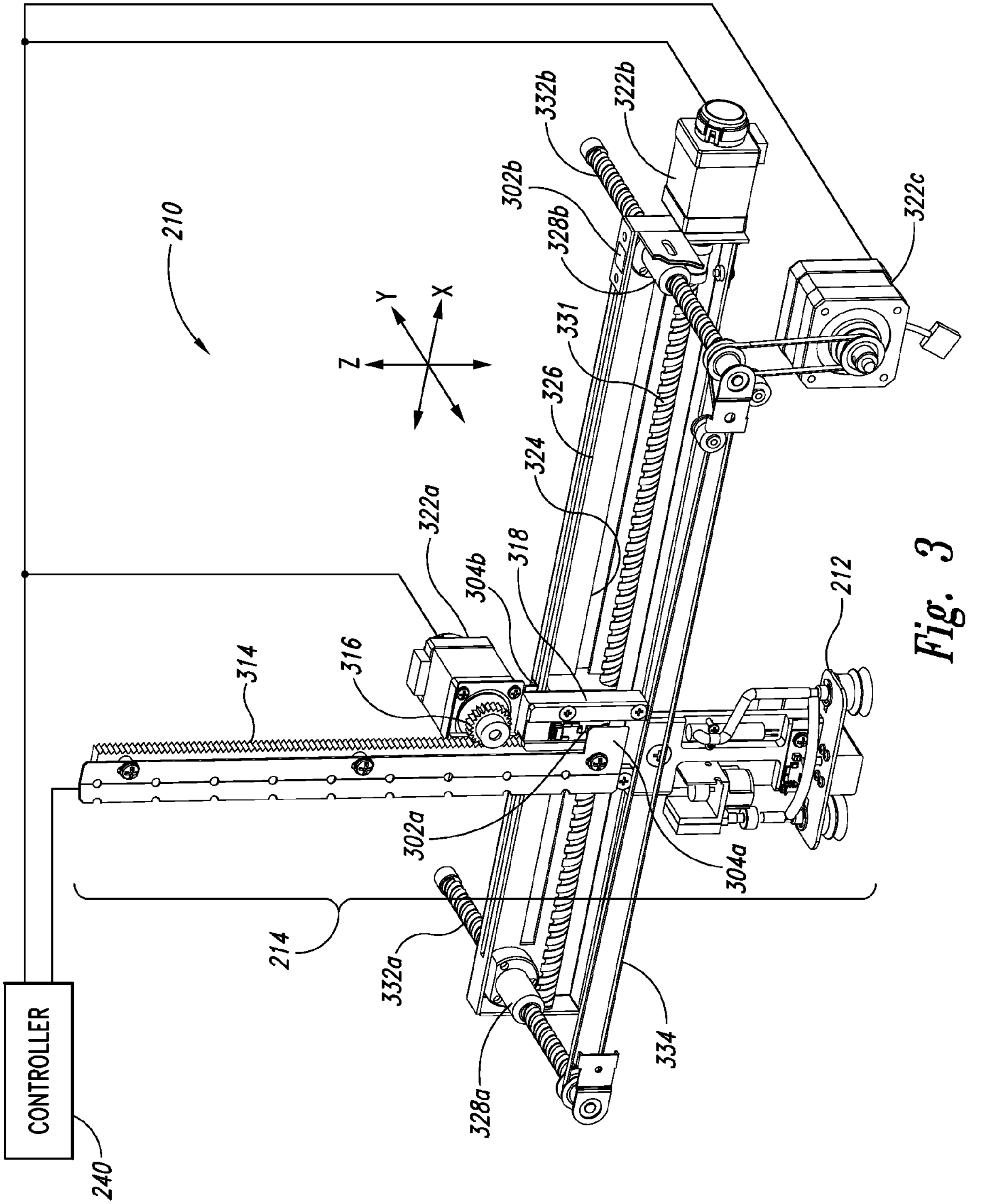
FIG. 3 is an enlarged, partially schematic isometric view of a card transport assembly of the card dispensing apparatus of FIG. 2, configured in accordance with an embodiment of the invention.

FIG. 3 is an enlarged, partially schematic isometric view of the card transport assembly 210 of FIG. 2. In one aspect of this embodiment, the card carrier 214 includes an elongate rack 314 that slides up and down along the Z axis in a guide block 318. A first motor 322*a* (e.g., an electric stepper motor) is fixedly attached to the guide block 318 and is operably connected to the controller 240. The first motor 322*a* drives a pinion gear 316 that engages a row of teeth on the rack 314. Rotation of the pinion gear 316 in a first direction in response to signals from the controller 240 drives the rack 314 downwardly along the Z axis. Conversely, rotation of the pinion gear 316 in the opposite direction drives the rack 314 upwardly along the Z axis.

The guide block 318 is slideably supported in a track 324 that extends along a support member 326 in the X direction. A first lead screw 331 threadably engages the guide block 318 and is operably coupled to a second motor 322*b*. The second motor 322*b* is operably connected to the controller 240. Rotation of the first lead screw 331 in a first direction in response to signals from the controller 240 moves the guide block 318 (and, accordingly, the card carrier 214) in a first direction along the X axis. Conversely, rotation of the first lead screw 331 in the opposite direction moves the guide block 318 in the opposite direction along the X axis.

A second lead screw 332*a* threadably engages a first lead nut 328*a* attached toward one end of the support member 326. Similarly, a third lead screw 332*b* threadably engages a second lead nut 328*b* attached toward the opposite end of the support member 326. A third motor 322*c* simultaneously drives both the second and third lead screws 332 by means of a timing belt 334. The third motor 322*c* is operably connected to the controller 240. Rotation of the lead screws 332 in a first direction in response to signals from the controller 240 moves the support member 326 (and, accordingly, the card carrier 214) in a first direction along the Y axis. Conversely, rotation of the lead screws 332 in the opposite direction moves the support member 326 in the opposite direction along the Y axis.

In another aspect of this embodiment, the card transport assembly 210 can further include a system of sensors that signal the controller 240 when the selector head 212 is in a "home" position. For example, in the illustrated embodiment, the card transport assembly 210 includes a first position sensor 302*a* fixedly attached to the guide block 318, and a corresponding first sensor flag 304*a* fixedly attached to the elongate rack 314. The first sensor 302*a* can include a reflective infrared device that detects the presence of the first sensor flag 304*a* when the selector head 212 is in the retracted position shown in FIG. 3. The card transport assembly 210 can further include a second position sensor 302*b* mounted to the support member 326, and a corresponding second sensor flag 304*b* attached to the guide block 318. The second sensor 302*b* can be similar in structure and function to the first sensor 302*a*, and can detect the presence of the second sensor flag 304*b* when the guide block 318 moves to the right in FIG. 3 to a "home" position on the support member 326. Although not shown in FIG. 3, a third sensor flag can be attached to the support member 326, and a corresponding third position sensor can be attached to the chassis 220 (FIG. 2) to detect when the support member 326 moves to a similar "home" position on the lead screws 332.

In other embodiments, other methods can be used to track the location of the selector head 212 relative to the chassis 220. For example, in one embodiment, the controller 240 can monitor rotations or "steps" of the individual motors 322*a*, 322*b*, and 322*c* and use these to determine the location of the selector head 212. In yet other embodiments, contact sensors or limit switches, as opposed to infrared sensors, can be used to track selector head position. In still further embodiments, various combinations of the foregoing apparatuses and methods can be used for this purpose.

Figure 4:
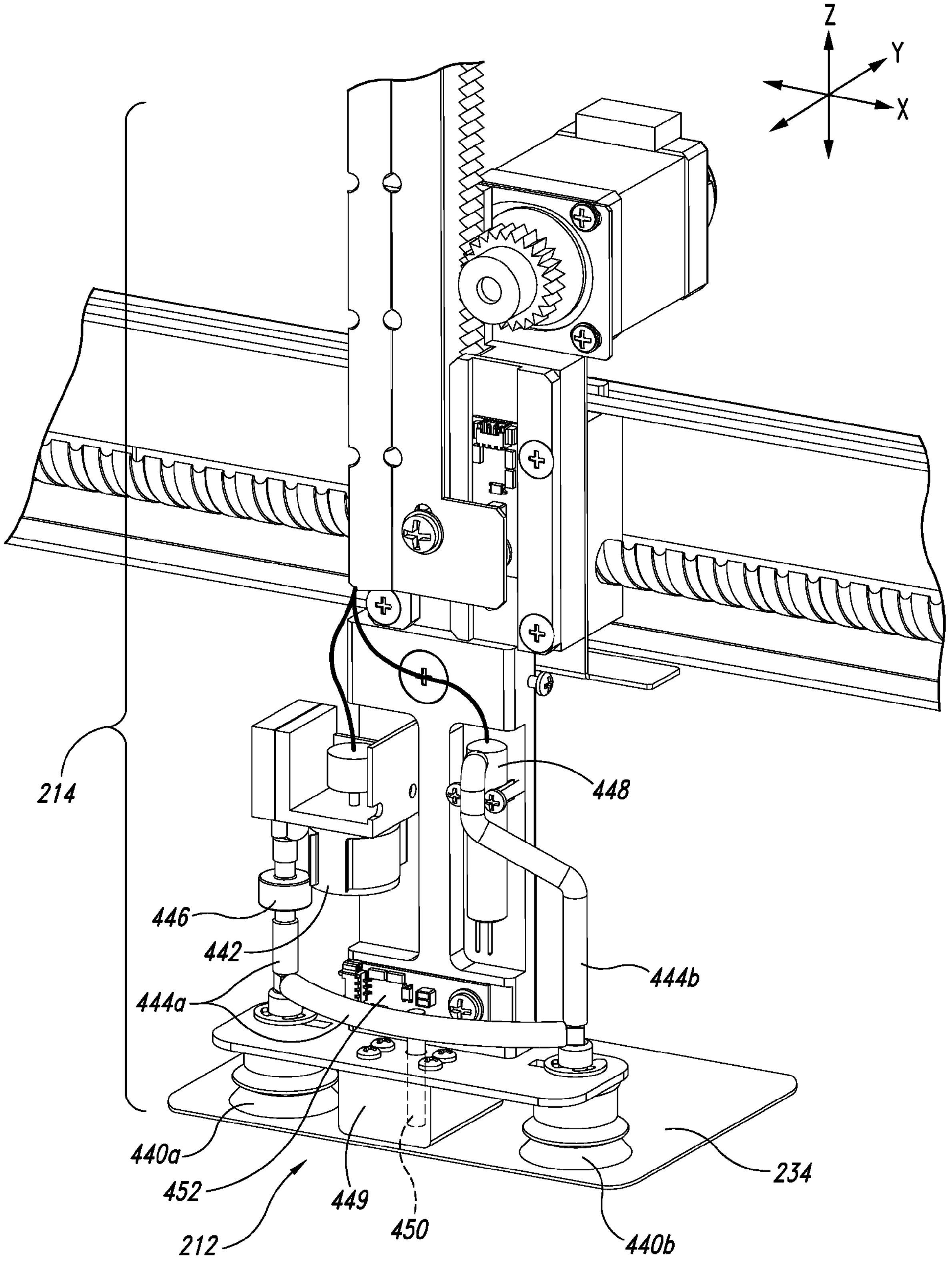
FIG. 4 is an enlarged isometric view of a card carrier of the card transport assembly of FIG. 3, configured in accordance with an embodiment of the invention.

FIG. 4 is an enlarged isometric view of a portion of the card carrier 214 described above with reference to FIGS. 2 and 3. In one aspect of this embodiment, the selector head 212 includes a first suction cup 440*a* and a second suction cup 440*b* connected to a pump 442 by a vacuum line 444*a*. Activation of the pump 442 by the controller 240 (FIG. 2) creates a vacuum in the suction cups 440 that causes the card 234 to stick to the cups. A one-way check valve 446 is spliced into the vacuum line 444*a* to maintain the vacuum in the event the power is lost or the pump 442 is inadvertently turned off. In the illustrated embodiment, the pump 442 can be a Thomas model 2002 micro-pump from Thomas Scientific, P.O. Box 99, Swedesboro, N.J. 08085. This pump is capable of achieving a maximum intermittent vacuum level of about 10.4 Hg (about 5.12 PSIG). In other embodiments, other pumps can be used to evacuate the suction cups 440.

In another aspect of this embodiment, the suction cups 440 are also connected to a release valve 448 by a vent line 444*b*. The release valve 448 works in conjunction with the check valve 446 to maintain vacuum in the suction cups 440 during card transport. When the card 234 arrives at the release location 270 (FIG. 2), the controller 240 turns the pump 442 off and opens the release valve 448 to release the vacuum in the suction cups 440 and drop the card 234. In the illustrated embodiment, the release valve 448 can be a simple solenoid valve, such as a Lee solenoid valve from the Lee Company of 2 Pettipaug Rd, P.O. Box 424, Westbrook, Conn. 06498. In other embodiments, other types of valves can be used to release the vacuum in the suction cups 440 and drop the card 234.

In most instances, the suction cups 440 only pick up one card when they are evacuated. Occasionally, however, two or more cards are stuck together in a stack. When this occurs, the suction cups 440 may inadvertently pick up both cards. One way to overcome this problem in accordance with the present invention it to cycle the release valve 448 at a very high frequency after picking up a card. Cycling the release valve 448 in this manner while the pump 442 is on causes the vacuum pressure in the suction cup 440 to vary, which in turn causes the card to flex. This flexing tends to break any adhesion that may exist between the top card and any under card, causing the under card to drop back onto the card stack.

Another method for solving this problem in accordance with the present invention is to arrange the suction cups 440 on opposite sides of a raised portion 449 (e.g., a raised ridge, bump, etc.). As the suction cups 440 are evacuated, they draw the selected card inwardly, bending the card over the raised portion 449. This bend tends to break any adhesion that may exist between the top card and any under card, causing the under card to fall back into the card stack.

In another aspect of the embodiment, the selector head 212 further includes a depth probe 450 for controlling the position of the suction cups 440 relative to the card 234. When the selector head 212 is not holding the card 234, the depth probe 450 extends down below the suction cups 440. As the suction cups 440 move downwardly toward the card 234, the depth probe 450 contacts the card 234 and begins sliding upwardly along the Z axis. The depth probe 450 is operably coupled to a switch 452, which in turn is connected to the controller 240 (FIG. 2). When the position of the depth probe 450 indicates that the suction cups 440 are in the desired position relative to the card 234 (e.g., sufficiently sealed against the card), the switch 452 sends a signal to the controller 240 that causes the card carrier 214 to stop moving downward toward the card 234. At this time, the controller 240 activates the pump 442 to evacuate the suction cups 440. The resulting suction holds the card 234 against the suction cups 440 so that the card carrier 214 can lift the card from the corresponding hopper 232 (FIG. 2). If the card 234 inadvertently falls off the suction cups 440 at any time, the depth probe 450 drops, causing the switch 452 to send a corresponding signal to the controller 240. The controller 240 can then respond by sending the card carrier 214 back toward the appropriate card hopper 232 to retrieve a new card.

Returning to FIG. 2, the card dispensing apparatus 210 can be used in one embodiment as follows. First, the user selects a desired card with the user-interface 252. The user-interface 252 transmits this request to the central computer 250, which in turn sends a corresponding instruction to the processor 251. After the processor 251 has confirmed payment for the card via the bill acceptor, card swipe, etc., the processor 251 instructs the controller 240 to dispense the selected card. The controller 240 then positions the card carrier 214 over the appropriate card hopper 232 by using the stepper motors 322*a*-*c* as described above with reference to FIG. 3. Once the card carrier 214 is in the proper position, the first stepper motor 322*a* drives the card carrier 214 downwardly toward the top card on the stack.

Referring now to FIGS. 2-4 together, as the selector head 212 moves downwardly along the Z axis toward the desired card (e.g., the card 234), the depth probe 450 contacts the card and begins moving upwardly relative to the switch 452. When the position of the depth probe 450 indicates that the suction cups 440 are sufficiently contacting the card 234, the switch 452 sends a signal to the controller 240 halting further downward motion of the card carrier 214. Next, the vacuum pump 442 at least partially evacuates the suction cups 440 to draw the card 234 against the cups. The check valve 446 ensures that (at least partial) vacuum is maintained in the suction cups 440 if power is lost or the pump 442 is inadvertently turned off. The first stepper motor 322*a* then drives the rack 314 upwardly along the Z axis to lift the card 234 out of the respective hopper 232. The second motor 322*b* then drives the first lead screw 331, and the third stepper motor 322*c* then drives the second and third lead screws 332, as required to position the card 234 in front of the card reader 290.

Figure 5:
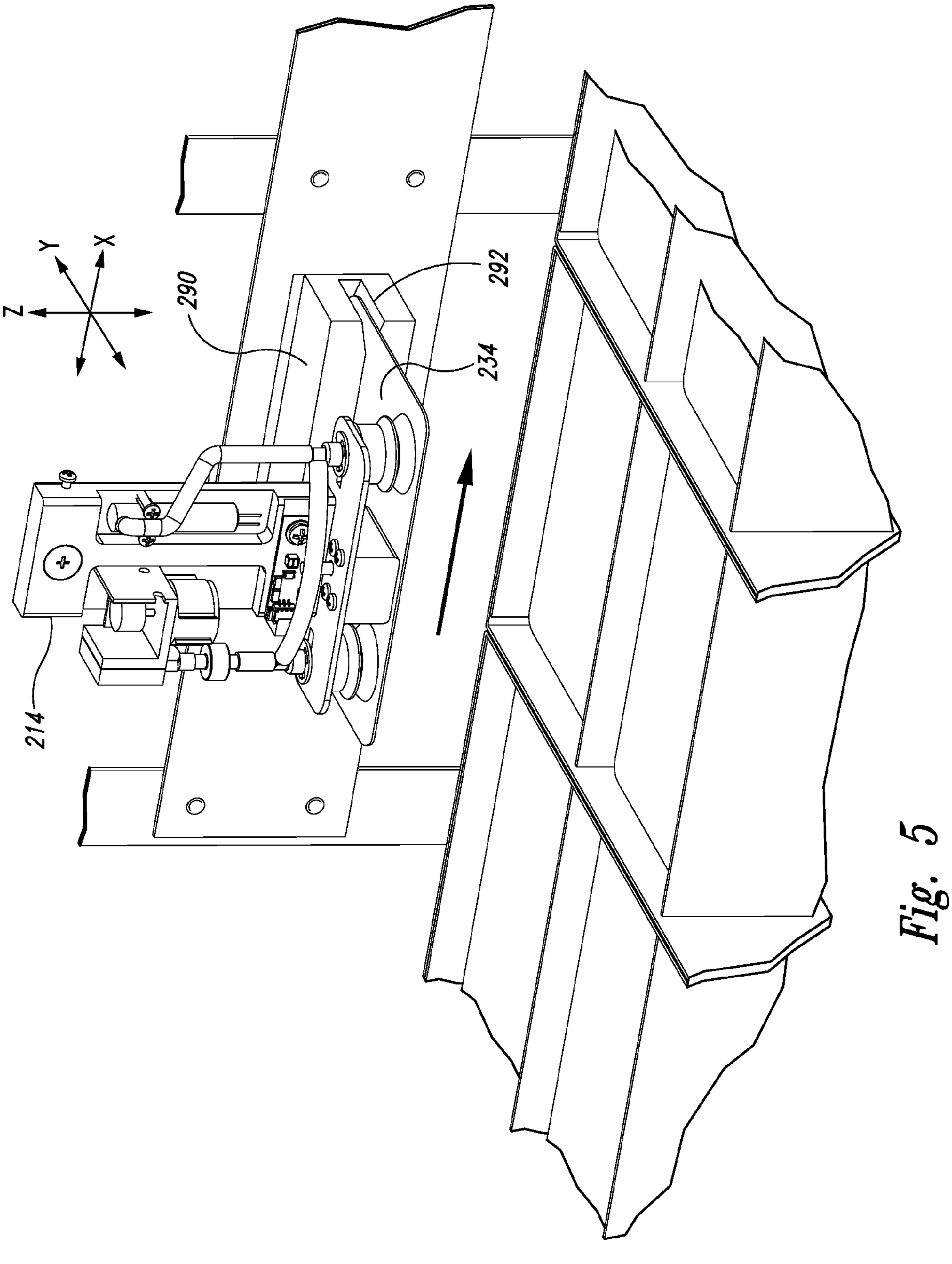
FIG. 5 is an enlarged isometric view of a card being swiped through a card reader by the card carrier of FIG. 4, in accordance with an embodiment of the invention.

FIG. 5 is an enlarged isometric view of the card carrier 214 swiping the card 234 through the card reader 290. As this view illustrates, the card carrier 214 moves the card 234 through the slot 292 in the X direction so that the card reader 290 can read card-specific data (e.g., an associated account number) off a magnetic stripe or other media on the card. If the card 234 is sufficiently read after the first pass through the card reader 290, then the card carrier 214 proceeds to the release location 270 (FIG. 2). If the card 234 is not sufficiently read, then the controller 240 signals the card transport assembly 210 to swipe the card through the card reader 290 a second time. The card 234 can be repeatedly swiped until it is either sufficiently read or a preset limit of swipes (e.g., three swipes) is reached. If the limit is reached and the card 234 still has not been sufficiently read, then the card can be discarded into a reject bin (described below). This situation could occur if, for example, the card is defective or it was inadvertently loaded into the hopper upside down or backward.

Figure 6A:
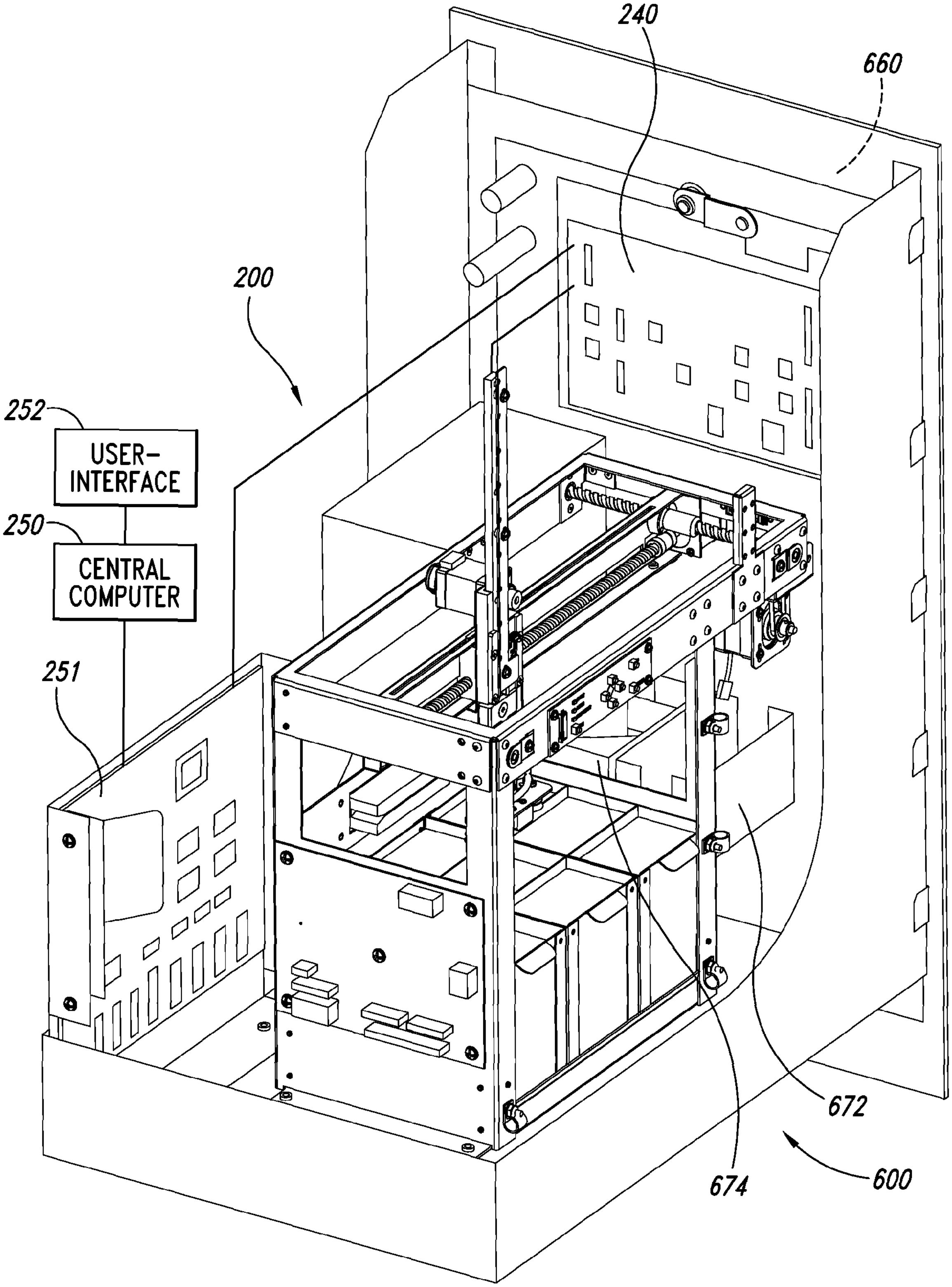
FIGS. 6A and 6B are rear and front isometric views, respectively, of a card vending drawer assembly configured in accordance with an embodiment of the invention.
Figure 6B:
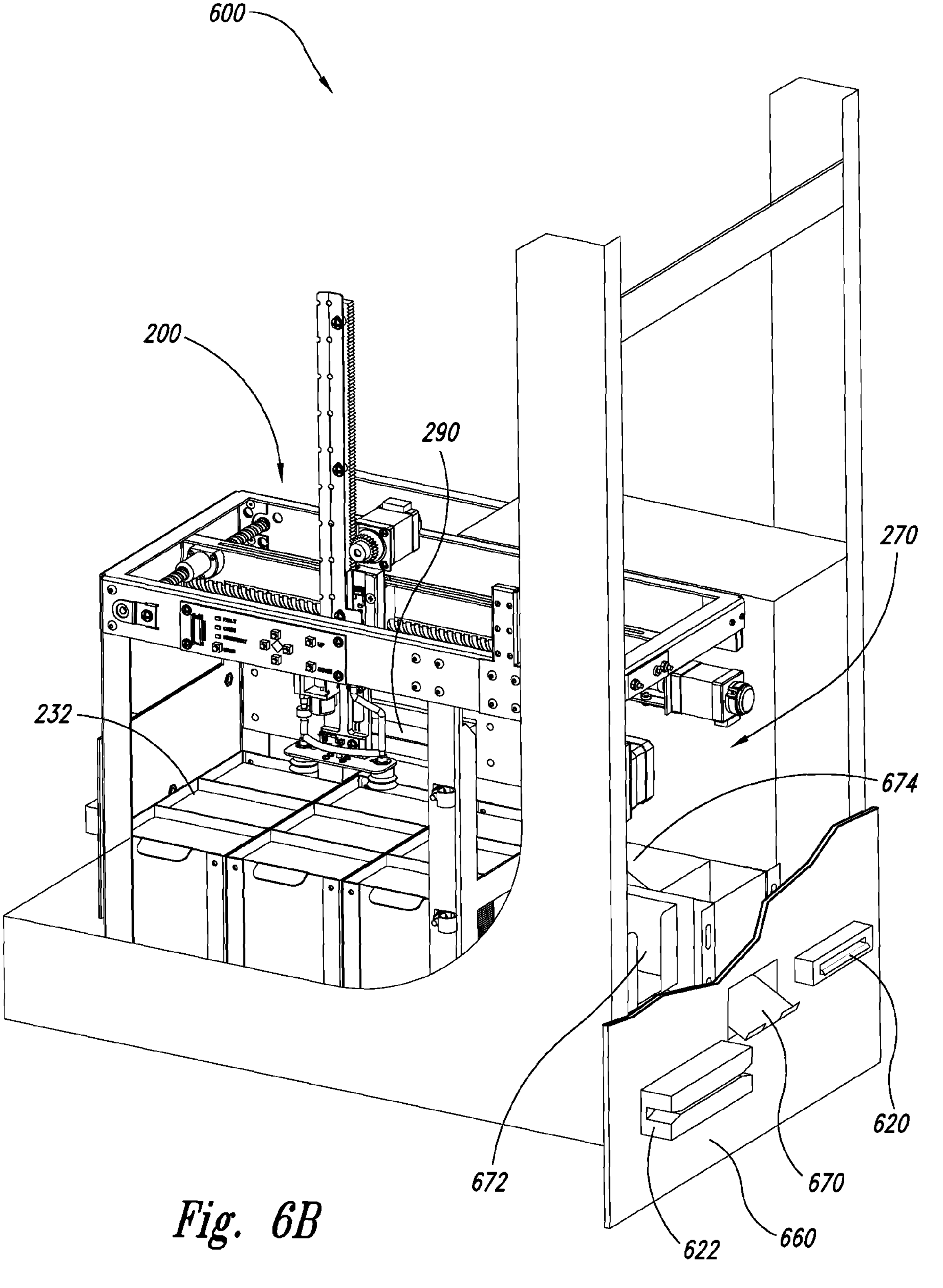

FIGS. 6A and 6B are rear and front isometric views, respectively, of the card dispensing apparatus 200 of FIG. 2 mounted to a drawer assembly 600 in accordance with an embodiment of the invention. As shown in FIG. 6A, the controller 240 is mounted to a backside of a front panel 660 of the drawer assembly 600, and the card dispensing processor 251 is mounted toward a rear portion of the drawer assembly 600. Referring to FIG. 6B, the front panel 660 can support a number of different devices for receiving funds and/or other forms of payment from a user. For example, the front panel 660 can include a card reader 622 and a bill acceptor 620. The card reader 622 can be configured to read a conventional credit card, debit card, ATM card, or the like when swiped through the card reader 622 by the user. The bill acceptor 620 can be configured to receive paper money from the user.

In one aspect of this embodiment, the drawer assembly 600 further includes a card chute 674 that leads to a card outlet 670. In operation, the card dispensing apparatus 200 retrieves a desired card 234 from one of the card hoppers 232, swipes the card through the card reader 290, moves the card to the release location 270, and drops the card into the chute 674 for transfer to the outlet 670.

As explained above, the card dispensing apparatus 200 has the capability of swiping a card through the card reader 290 multiple times if required to sufficiently read information off the card (and/or write information to the card). If, however, the card reader 290 is unable to sufficiently read a card (because, for example, the card was placed into the hopper 232 upside down) after a preset number swipes (e.g., three), then the card dispensing apparatus 200 releases the unread card into a reject bin 672 and retrieves a new card from the appropriate hopper. This feature prevents the card dispensing apparatus 200 from dispensing unusable cards to customers, and allows any upside down/backward cards to be reused.

Figure 7:
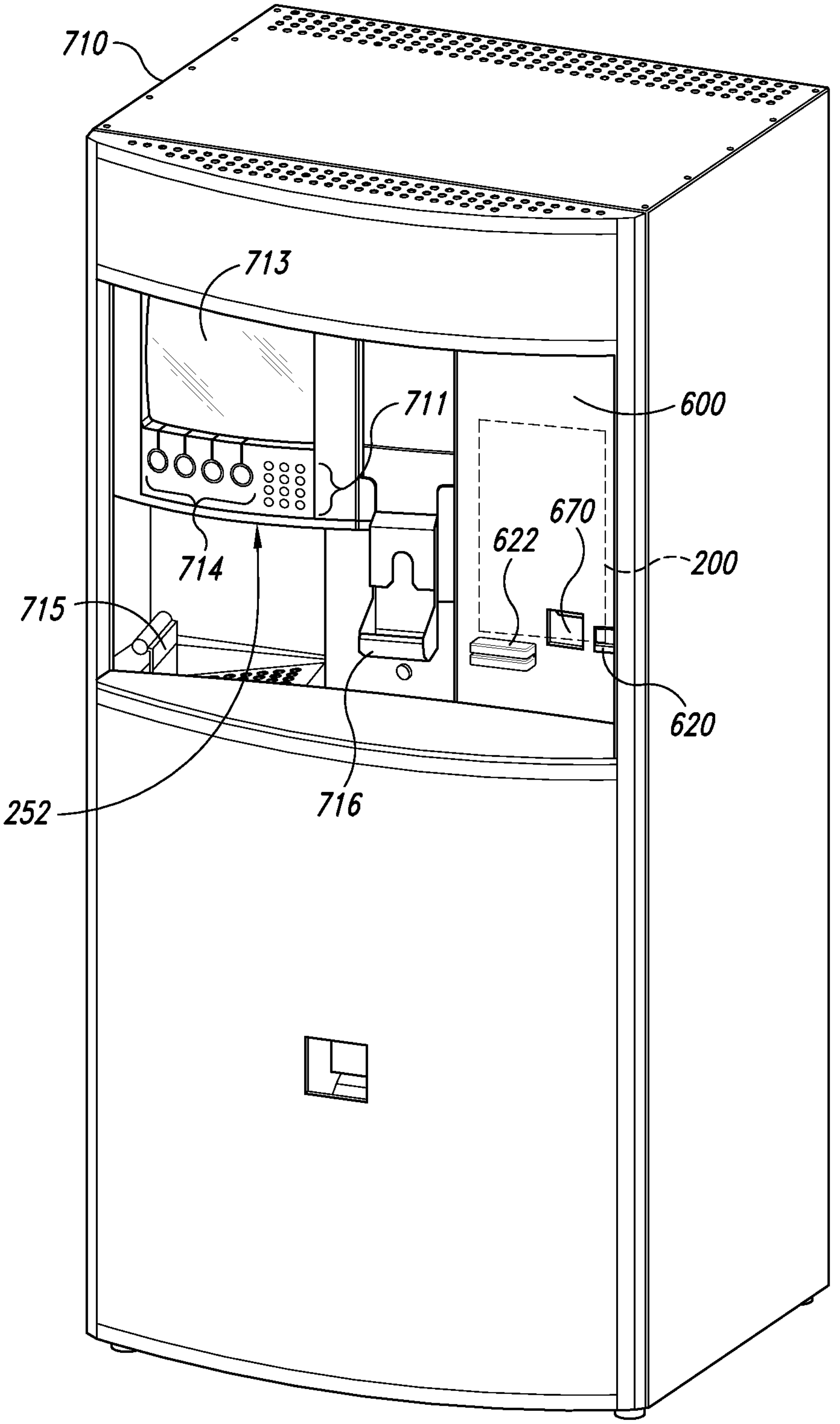
FIG. 7 is a front isometric view of a card vending structure that includes the drawer assembly of FIGS. 6A and 6B.

FIG. 7 is a front isometric view of a kiosk 710 that includes the drawer assembly 600 of FIG. 6 in accordance with an embodiment of the invention. In one aspect of this embodiment, the kiosk 710 can include features at least generally similar in structure and function to features of the coin-counting machines described in U.S. Pat. No. 6,494,776 to Molbak ("Molbak"), which is incorporated herein in its entirety by reference. In other embodiments, however, various aspects of the kiosk 710 can differ from the coin-counting machines described in Molbak, depending on the particular application.

In another aspect of this embodiment, the kiosk 710 includes a display screen 713 positioned proximate to the user interface 252. The user interface 252 includes user selection buttons 714 and a keypad 711. The display screen 713 can display various user instructions and prompts explaining how to purchase cards and/or perform other functions with the kiosk 710. The user selection buttons 714 can include, for example, various options for responding to the prompts and selecting a desired type of card or a desired method of payment. Similarly, the keypad 711 can allow the user to input various alphanumeric information, such as account numbers and/or monetary values, related to the card purchase transaction.

In a further aspect of this embodiment, the kiosk 710 also includes a coin input region or tray 715 configured to receive a plurality of coins from a user for counting. In one embodiment, the user can elect to receive a redeemable voucher via an outlet 716 for a value related to the total amount of coins counted. In another embodiment, the user can elect to pay for a card (such as a prepaid credit card or phone card) with coins as an alternative to paying for the card with a credit card via the card reader 622 or with paper currency via the bill acceptor 620.

In another aspect of this embodiment, a user desiring to purchase a card from the kiosk 710 may do so by first reading the card purchase instructions and prompts displayed on the display screen 713. (Alternatively, the instructions can be provided on the front or side of the kiosk 710 along with product advertising and/or other graphics.) By using the selection buttons 714 and/or the keypad 711 to respond to the prompts, the user can select a particular type of card (e.g., a credit card, debit card, phone card, etc.) and a particular card value. In one embodiment, the available card values (e.g., the amount of money or long-distance minutes associated with a card) may be predefined such that the user must choose from a limited number of options. In other embodiments, the value may be variable such that the user may be able to specify a card value. In either embodiment, the user then enters payment (e.g., via the coin input tray 715, the card reader 622, and/or the bill acceptor 620) sufficient to cover the cost of the selected card. Once the kiosk 710 confirms receipt of payment, the card dispensing apparatus 200 dispenses the desired card of the desired value to the user via the card outlet 670.

As mentioned above, in one embodiment, the kiosk 710 can be networked via the central computer 250 (FIG. 2) to other card vending machines and/or remote computer systems to exchange information related to card purchases. Such information can include, for example, bank account and credit/debit card account information, in addition to long-distance calling card account information. In another embodiment, the kiosk 710 can be networked to one or more remote computer systems and configured to transmit an appropriate signal when the machine is out of one or more types of cards. Service personnel with access to the remote computer system can then respond to the signal by restocking the machine with the needed cards. Similar signals can be transmitted from the kiosk 710 to the remote computer when the machine is malfunctioning, jammed, full of coins or other currency, and/or subject to theft, vandalism, or another form of tampering.

Figure 8:
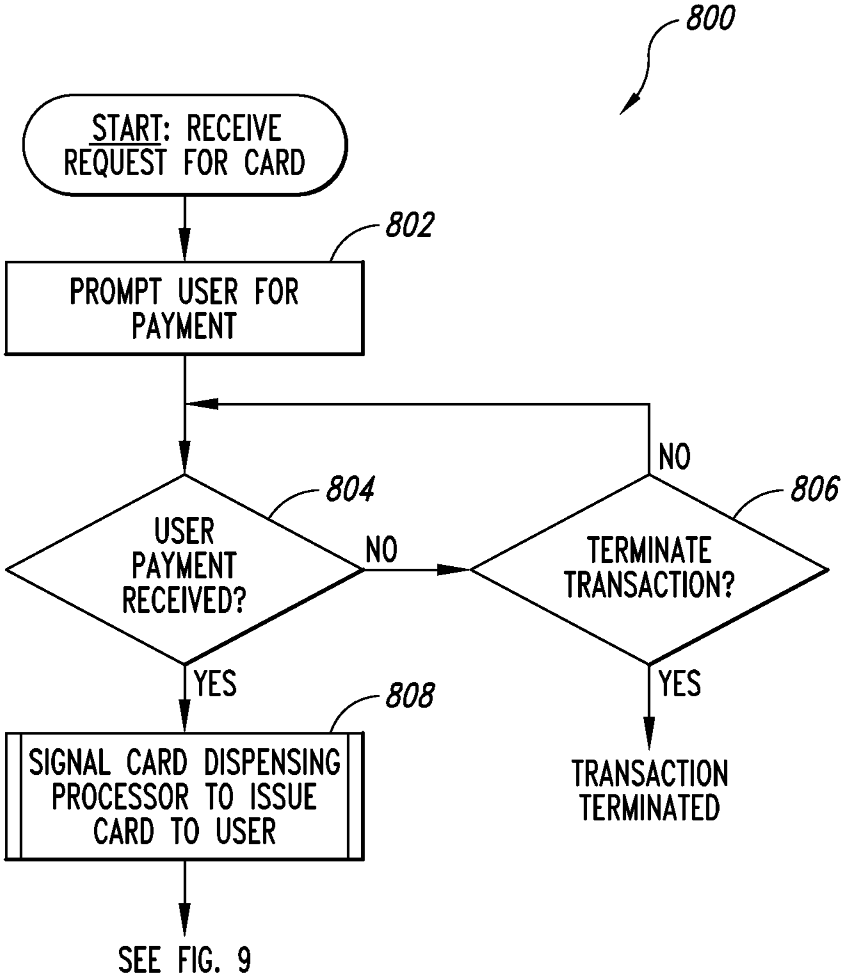
FIG. 8 is a flow diagram illustrating a routine for dispensing a card from a kiosk or other enclosure in accordance with an embodiment of the invention.

FIG. 8 is a flow diagram illustrating a routine 800 for dispensing a selected card to a user with the card dispensing apparatus 200 of FIG. 2, in accordance with an embodiment of the invention. In one aspect of this embodiment, the routine 800 can be carried out by the central computer 250 (FIG. 2) according to computer-executable instructions stored on a computer-readable medium, such as a floppy disk, CD-ROM, integrated circuit chip, etc. The routine 800 starts when the central computer 250 receives a request for a particular type of card. This request may come from the user interface 252 which, as described above, can include a keypad, touch screen, and/or other user selection buttons. In response to the card request, in block 802, the routine 800 prompts the user for payment for the card. Such payment can include cash received in the form of coins or bills, credit received in the form of a credit card account number, and/or debit in the form of a debit card account number. In other embodiments, cards can be purchased using other forms of payment, including voucher and/or prepayment from a remote computer via a computer network or an associated web site.

In decision block 804, the routine 800 determines if payment for the card has been received from the user or otherwise confirmed. If payment has not been received, then in decision block 806 the routine 800 determines if the transaction should be terminated. In one embodiment, the routine 800 can elect to terminate the transaction based on the amount of time that has elapsed without receiving payment from the user. In other embodiments, termination can be based on other factors, such as user termination input or lack of a user response to an appropriate prompt. If, however, the routine 800 determines that the transaction should not be terminated, then the routine 800 continues to wait for user payment and/or it can reprompt the user for payment. Once the routine 800 confirms that payment has been received, the routine proceeds to block 808 and signals the card dispensing processor 251 to issue the selected card to the user.

Figure 9:
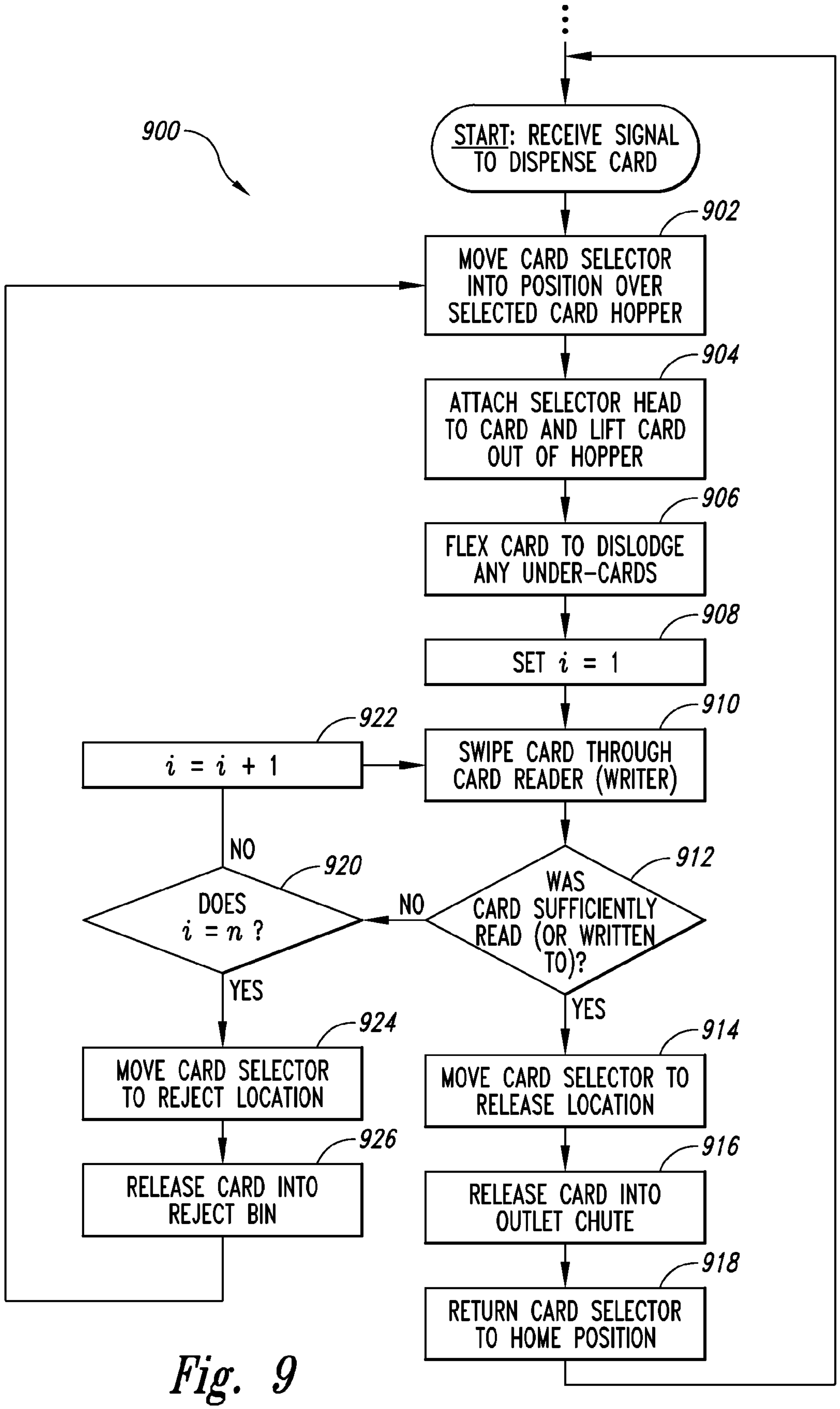
FIG. 9 is a flow diagram illustrating a routine for dispensing a card from a kiosk or other enclosure in accordance with another embodiment of the invention.

FIG. 9 is a flow diagram illustrating a routine 900 for dispensing a selected card to a user with the card dispensing apparatus 200 of FIG. 2, in accordance with another embodiment of the invention. In one aspect of this embodiment, the routine 900 can be carried out by the card dispensing processor 251 (FIG. 2) when it receives an instruction from the central computer 250 to dispense a particular card to the user. In block 902, the routine 900 responds (via the controller 240) by moving the card carrier 214 into position over the appropriate card hopper 232. In block 904, the routine 900 attaches the desired card to the selector head 212 (using, e.g., suction) and lifts the card out of the hopper 232 with the card carrier 214. In block 906, the routine 900 flexes the card with the selector head 212 to cause any under-cards to fall away.

In block 908, the routine 900 sets a counter i=1. Next, in block 910, the routine 900 moves the card carrier 214 past the card reader 290 (or card reader/writer 290) to swipe the selected card through the reader. In decision block 912, the routine 900 determines if the card was sufficiently read (or written to) by the card reader 290. If so, then the routine 900 proceeds to block 914 and moves the card carrier 214 to the release location 270 (FIGS. 2 and 6B). In block 916, the routine 900 releases the card into the outlet chute 674. In block 918, the routine 900 returns the card carrier 214 to the home position, and awaits another signal to dispense a card.

Returning to decision block 912, if the card was not sufficiently read (or written to) by the card reader 290, then the routine 900 proceeds to decision block 920 and determines if $i=\eta$. Here, $\eta$ can be a preselected number of times that a given card will be swiped through the card reader 290 before being rejected. In one embodiment, for example, $\eta$ can be three. In other embodiments, $\eta$ can have other values (e.g., 2, 4, 6, 10, etc.) depending on other factors. If i does not equal $\eta$ at decision block 920, then the routine 900 proceeds to block 922 and increments i by one. Next, the routine 900 returns to block 910 and repeats. If i does equal $\eta$ at decision block 920, then the routine 900 proceeds to block 924 and moves the card carrier 214 to the card reject location. In block 926, the routine 900 releases the unread card into the reject bin 672. From here, the routine 900 returns to block 902 and repeats until the desired card has been dropped into the outlet chute.

Figure 10:
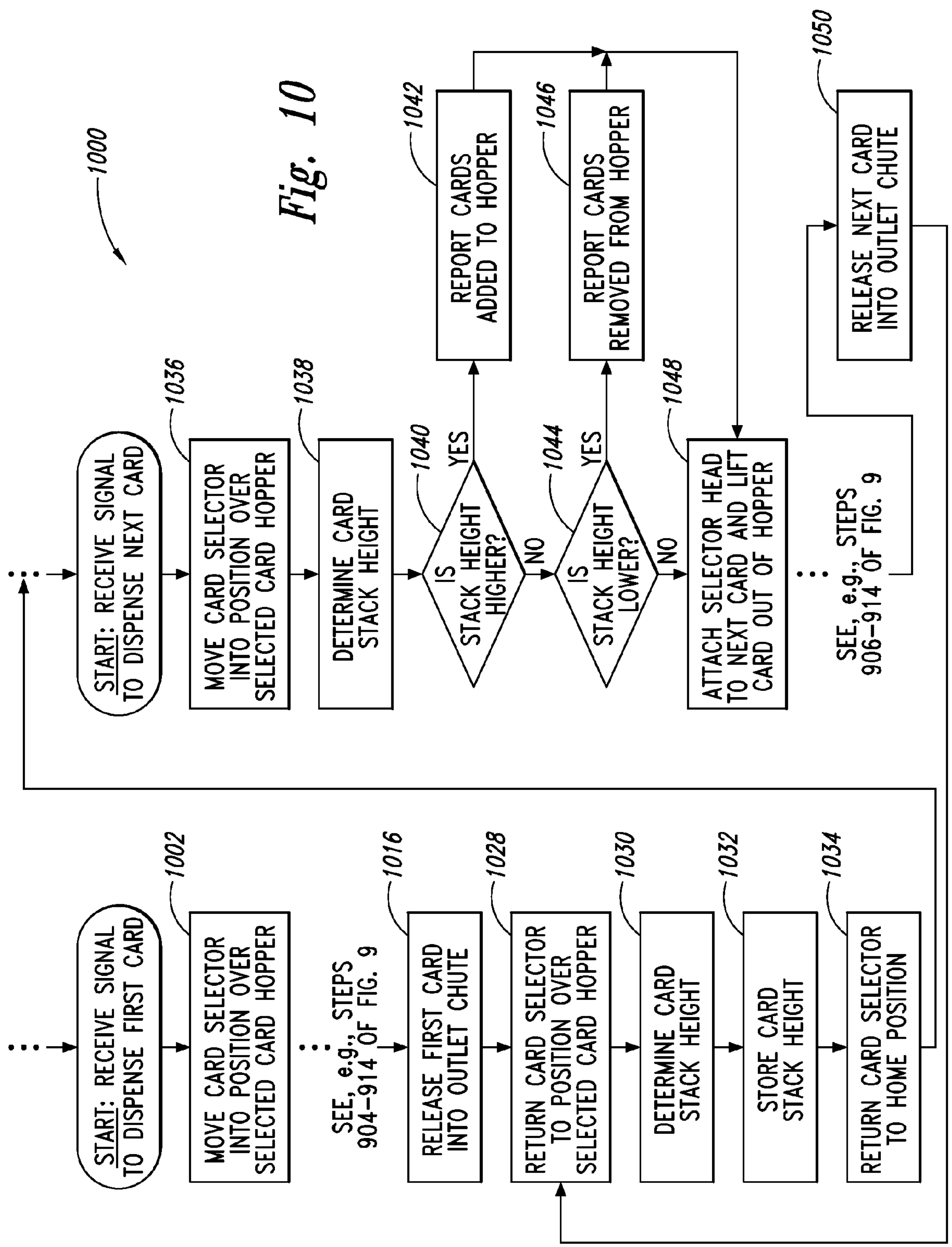
FIG. 10 is a flow diagram illustrating a routine for monitoring card stacks in a card dispensing apparatus in accordance with an embodiment of the disclosure.

FIG. 10 is a flow diagram of a routine 1000 for monitoring card stacks in a card dispensing apparatus in accordance with an embodiment of the disclosure. In one embodiment, the routine 1000 can be implemented by the card dispensing processor 251 (FIG. 2) when it receives an instruction from the central computer 250 to dispense a particular card to a user. In block 1002, the routine 1000 responds to the instruction by moving the card carrier 214 into position over the appropriate card hopper 232. Once the card carrier 214 is in position, the routine 1000 attaches the selector head 212 to the desired card and lifts the card out of the hopper 232. The routine 1000 then moves the card past the card reader 290 to read the card, and then on to the release location 270 (FIGS. 2 and 6B) as described in detail above with reference to blocks 904-914 in FIG. 9. In block 1016, the routine 1000 releases the card into the card outlet chute 674.

After releasing the selected card into the card outlet chute, the routine 1000 returns the card carrier 214 to the selected card hopper 232, as shown in block 1028. In block 1030, the routine 1000 determines the height of the card stack in the card hopper 232. In one embodiment, the stack height can be determined by counting the number of steps taken by the first motor 322*a* (FIG. 3) as it drives the rack 314 downwardly until the depth probe 450 (FIG. 4) contacts the top card in the stack and activates the switch 452 (FIG. 4). In block 1032, the measured card stack height is stored in memory, such as memory associated with the central computer 250 (FIG. 2). After determining the card stack height, the routine 1000 returns the card selector 212 to the home position, as shown in block 1034.

When the routine 1000 receives a signal to dispense the next card from the same card hopper 232, the routine 1000 again responds by moving the card carrier 214 into position over the card hopper 232, as shown in block 1036. In block 1038, the routine 1000 again checks the height of the card stack in the hopper 232 (using e.g., the steps described above). In decision blocks 1040 and 1044, the routine 1000 determines if the height of the card stack has changed since the last card was removed from the card hopper 232. More specifically, in block 1040 the routine 1000 determines if the stack height is higher than it previously was. If so, then the routine proceeds to block 1042 and prepares a report indicating that cards were added to the card hopper 232 after the previous card was removed from the hopper 232. In one embodiment, the report can be an electronic report that is transmitted to a remote computer (such as a central operator computer) to inform service personnel that cards have been added to the hopper 232 by, e.g., a field technician.

Conversely, if the card stack height is not higher than it previously was, then the routine 1000 proceeds to decision block 1044 to determine if the stack height is lower than it was after the last card was removed from the hopper 232. If the stack height is lower, then the routine 1000 proceeds to block 1046 and prepares a report (e.g., an electronic report) indicating that someone has removed cards from the hopper 232 after the previous card was dispensed. This report can be used to determine if cards have been stolen from the card hopper 232. If the card stack is neither higher nor lower than it previously was, then presumably no cards have been added or removed from the hopper 232.

After the status of the card stack has been determined and an appropriate report (if applicable) has been prepared and sent, the routine 1000 proceeds to block 1048, attaches the selector head 212 to the top card, and lifts the top card out of the hopper 232. The routine 1000 then moves the card toward the release location as described above in reference to, e.g., blocks 906-914 of FIG. 9. In block 1050, the routine 1000 releases the card into the outlet chute 674. After block 1050, the routine 1000 returns to block 1028 and repeats.

Figure 11:
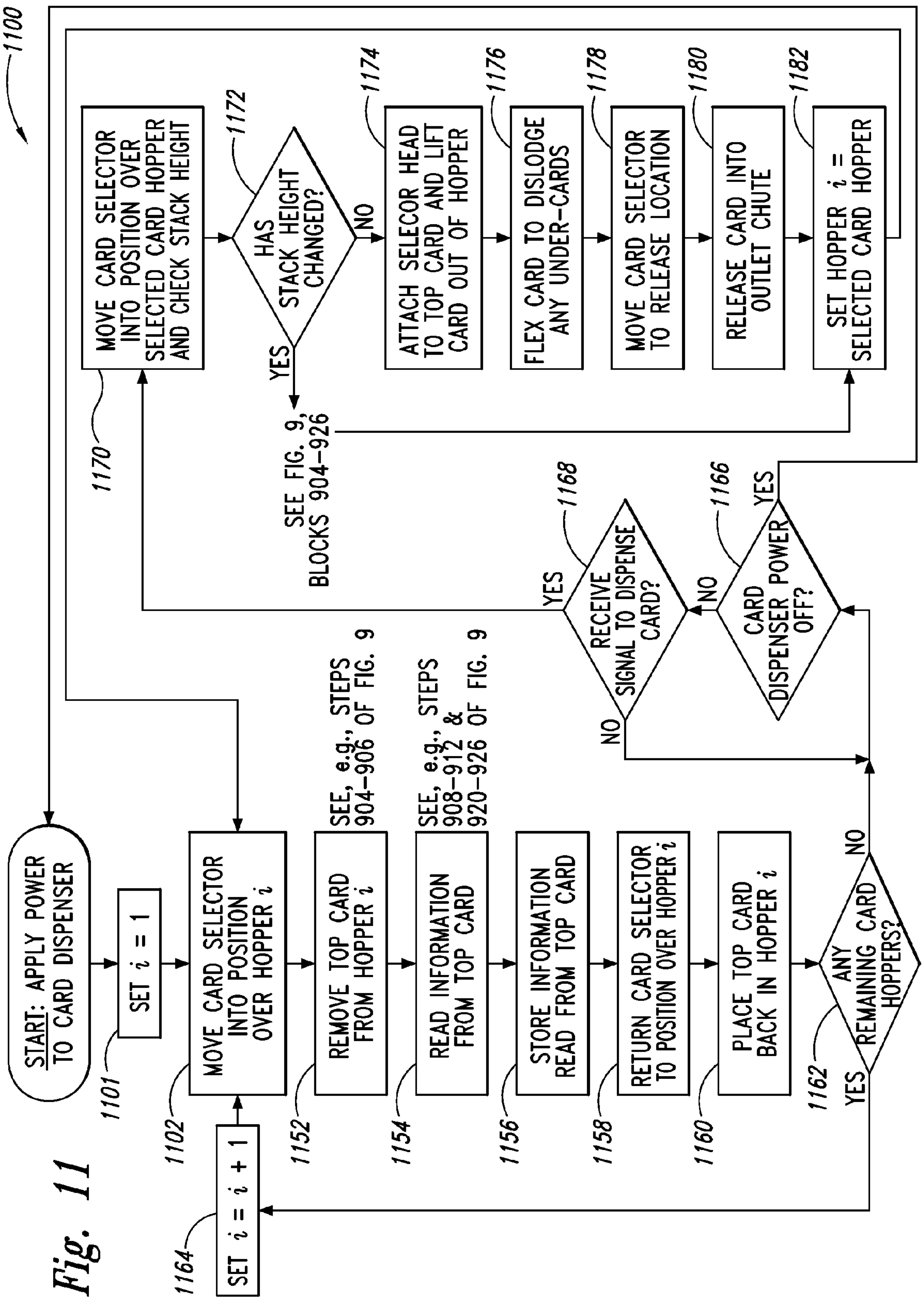
FIG. 11 is a flow diagram illustrating a routine for dispensing cards from a kiosk or other enclosure in accordance with a further embodiment of the disclosure.

FIG. 11 is a flow diagram illustrating a routine 1100 for dispensing cards from a kiosk or other enclosure in accordance with a further embodiment of the disclosure. As with the routines 900 and 1000 described above, the routine 1100 can also be carried out by the card dispensing apparatus 200 of FIG. 2. The routine 1100 can begin when the card dispensing apparatus 200 is first powered-up, after it has been reloaded with cards, or at some other suitable time. In block 1101, the routine 1100 sets a counter to i=1. In block 1102, the routine 1100 moves the card carrier 214 into position over card $hopper_i$, which initially is $hopper_1$. In block 1152, the routine 1100 removes the top card from $hopper_1$. In block 1154, the routine 1100 reads information from the top card. This information can include, for example, a card identifier number read off a magnetic stripe, an account number, financial institution identifier, etc. In general, the information read from the top card in block 1156 corresponds to the information needed to remotely activate the top card or activate an account associated with the card. In one embodiment, the top card can be removed from $hopper_1$ and information can be read from the top card in the manner described above with reference to the routine 900 of FIG. 9.

In block 1156, the routine 1100 stores the information read from the top card in suitable memory, such as memory associated with the central computer 250. After the top card has been read and the information stored, the routine 1100 returns the card carrier 214 to the position over card $hopper_1$. In block 1160, the routine 1100 places the top card back in $hopper_1$. In decision block 1162, the routine 1100 determines if there are any other card hoppers in which the information from the top card has not been read and stored in memory. In the case of a card dispensing apparatus having, for example, nine independent card hoppers, there would be eight remaining card hoppers in which the top card had not been read. If other such card hoppers exist, the routine 1100 proceeds to block 1164 and increments i by 1. Next, the routine 1100 returns to block 1102 and moves the card carrier 214 into position over the second card hopper, i.e., $hopper_2$. The routine 1100 then repeats blocks 1152-1160 to read information from the top card in $hopper_2$, store the information from the card, and then return the card back to $hopper_2$. The foregoing steps of the routine 1100 continue to repeat until there are no remaining card hoppers in which the information from the top card has not been read and stored in memory.

Once all the top cards have been read, the routine 1100 proceeds to decision block 1166 to determine if the card dispensing apparatus has been shut off. If so, the card dispensing apparatus remains shut down until power is applied to the dispensing apparatus once again. Conversely, if the power has not been shut off, the routine 1100 proceeds to decision block 1168 to determine if the card dispensing apparatus has received a signal to dispense a desired card. If not, the routine 1100 returns to decision block 1166 and repeats until such time as the dispensing apparatus receives a signal to dispense a card.

When the routine 1100 receives a signal to dispense a desired card, the routine 1100 proceeds to block 1170 and moves the card carrier 214 into position over the appropriate card hopper and checks the height of the card stack. In one embodiment, the card stack height can be checked as described above with reference to the routine 1000. In decision block 1172, the routine 1100 determines if the stack height has changed since the top card in the hopper was previously read. If the card stack height has changed, this indicates that cards have either been added to or removed from the selected card hopper and the new top card will have to be read. Accordingly, the routine 1100 proceeds to remove the top card from the hopper, read the card, and then dispense the card as described above with reference to blocks 904-926 of FIG. 9.

Conversely, if in decision block 1172 the routine 1100 determines that the card stack height has not changed since the top card was previously read, then the routine 1100 attaches the selector head 212 (FIG. 2) to the top card and lifts the card out of the hopper. In block 1176, the routine 1100 flexes the card with the selector head 212 to cause any under-cards to fall away. In block 1178, the routine 1100 moves the card selector 212 into position at the release location without passing the card through the card reader 290. In block 1180, the routine 1100 releases the card into the outlet chute. In block 1182, the routine 1100 identifies the card hopper from which the card was just removed as $hopper_i$. The routine 1100 then returns to block 1102 and repeats the process of removing the new top card from $hopper_i$, reading the information from the card, and placing the card back in $hopper_i$.

In one aspect of the foregoing embodiment, the routine 1100 enables each top card in each card stack to be read before the card is ordered or sold. This speeds operation of the card dispensing apparatus because when a particular card is selected by a user, the dispensing apparatus 200 already has all the information associated with the card stored in memory. This enables the apparatus to simply retrieve the card from the appropriate hopper and dispense it, without having to read the card in the process. Once the top card is dispensed from a particular card stack, the new top card is read and the information stored in memory. In this way, the information from each top card can be read and stored at all times, enabling the top cards to be readily dispensed without taking additional time to read the cards prior to dispensing.

Moreover, checking the stack height before a card is dispensed ensures that the card being dispensed is the same card that was previously read during the "pre-reading process." A further advantage of this embodiment is that if a particular card cannot be sufficiently read, this can be determined during the pre-reading process and the card can be discarded, without having to go through the reading and discarding process after the card has been ordered by a customer or other user.

Figure 12A:
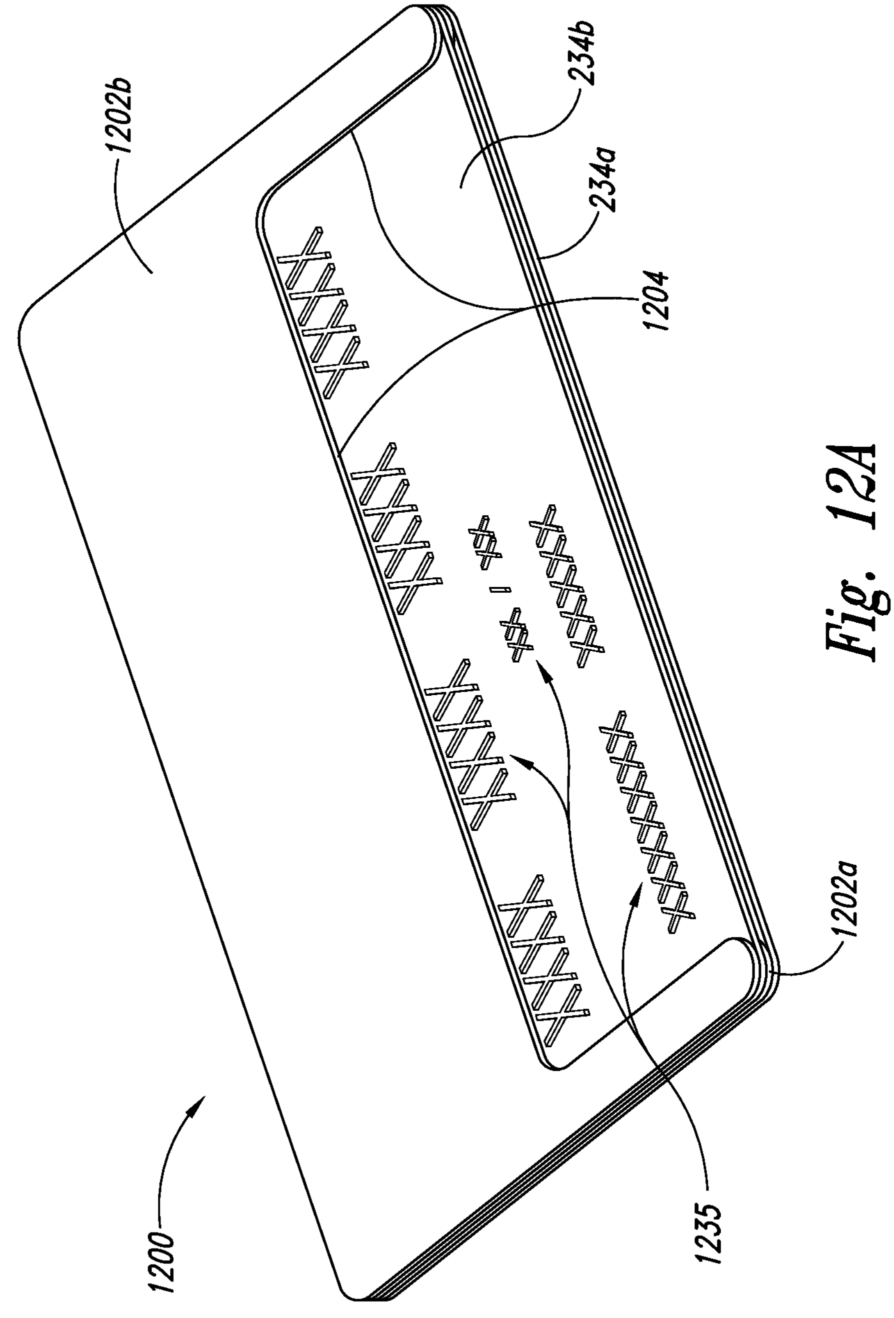
FIG. 12A is an isometric view.
Figure 12B:
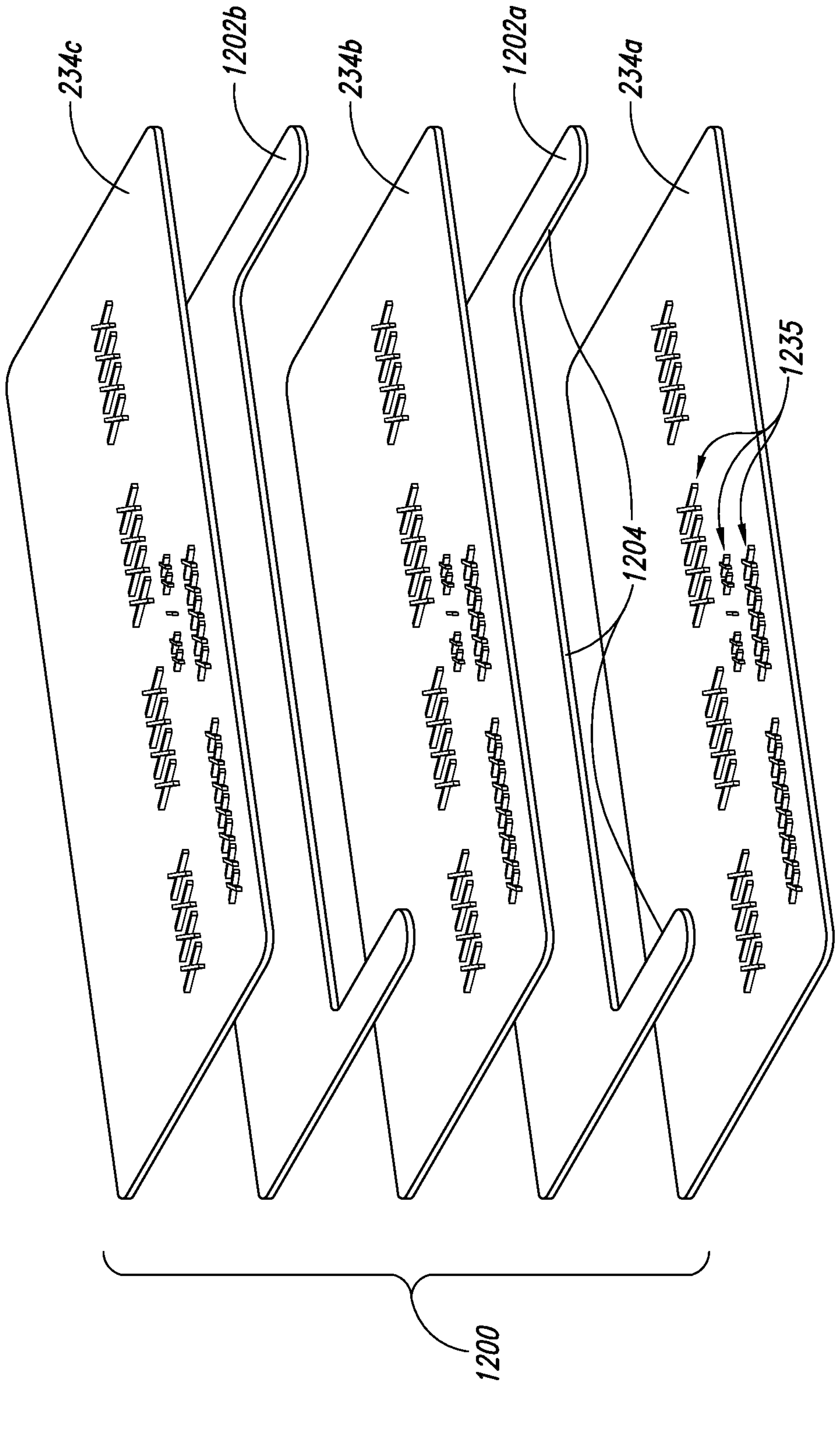
FIG. 12B is a corresponding exploded isometric view, of a card stack utilizing card spacers configured in accordance with an embodiment of the disclosure.

FIG. 12A is an isometric view, and FIG. 12B is a corresponding exploded isometric view, of a card stack 1200 utilizing card spacers 1202 configured in accordance with an embodiment of the disclosure. Referring first to FIG. 12B, in the illustrated embodiment the cards 234 can be conventional cards, such as conventional prepaid credit cards, debit cards, phone cards, etc. that include raised features such as embossing 1235. The embossing 1235 can include, for example, a 16-digit account number, an expiration date, the name of the associated retail establishment or telecom company, etc. The embossing 1235 can add from about 0.01 inch to about 0.03 inch, or about 0.02 inch to the thickness of the individual cards 234 in the embossed area. This can present a problem if the inter-card spacers 1202 are not used, because the cards 234 will stack unevenly and the top card 234*c* may not be level, making it difficult for the card selector 212 (FIG. 2) to properly attach to the top card 234*c*.

To overcome this problem, the card spacers 1202 can be manufactured from flat material having a thickness that is just slightly greater than that of the embossing 1235. For example, if the embossing is about 0.02 inch high, then the card spacers can be about 0.025 inch thick. Each of the card spacers 1202 includes a cutout portion 1204 that is shaped and sized to fit around the outside of the embossing 1235. This gives the card spacers 1202 somewhat of a "U" shape. As shown in FIG. 12A, this enables the cards 234 to be stacked vertically without any curving or unevenness resulting from the added thickness of the embossing 1235. The card spacers 1202 can be manufactured from aluminum sheet, plastic sheet, Teflon, and/or other suitable materials known in the art.

Returning to FIG. 12B, when the top card 234*c* is purchased the card selector 212 (FIG. 2) removes the card 234*c* from the card stack 1200 and transfers it to the card outlet chute 674 (FIG. 6B). The card selector 212 then returns to the card hopper, lifts the top spacer 1202*b* off of the card stack 1200, and deposits the spacer 1202*b* in a suitable location for reuse. In this way, a card and not a spacer will always be present at the top of the card stack 1200 when the next card is ordered, so that the card dispensing apparatus 200 will not inadvertently try to dispense a spacer.

Although FIGS. 12A and 12B illustrate one type of card spacer, other card spacers having other shapes and sizes can be used in vertical card stacks without departing from the present disclosure. For example, other card spacers can have other cutout portions with other shapes that may or may not be generally rectangular. Regardless of the shape or thickness of a particular card spacer, the card spacer should be configured to sit flat on the underlying card and provide enough surface area for the suction cups 440 (FIG. 4) to sufficiently attach to the card spacer for removal from the hopper.

Figure 13:
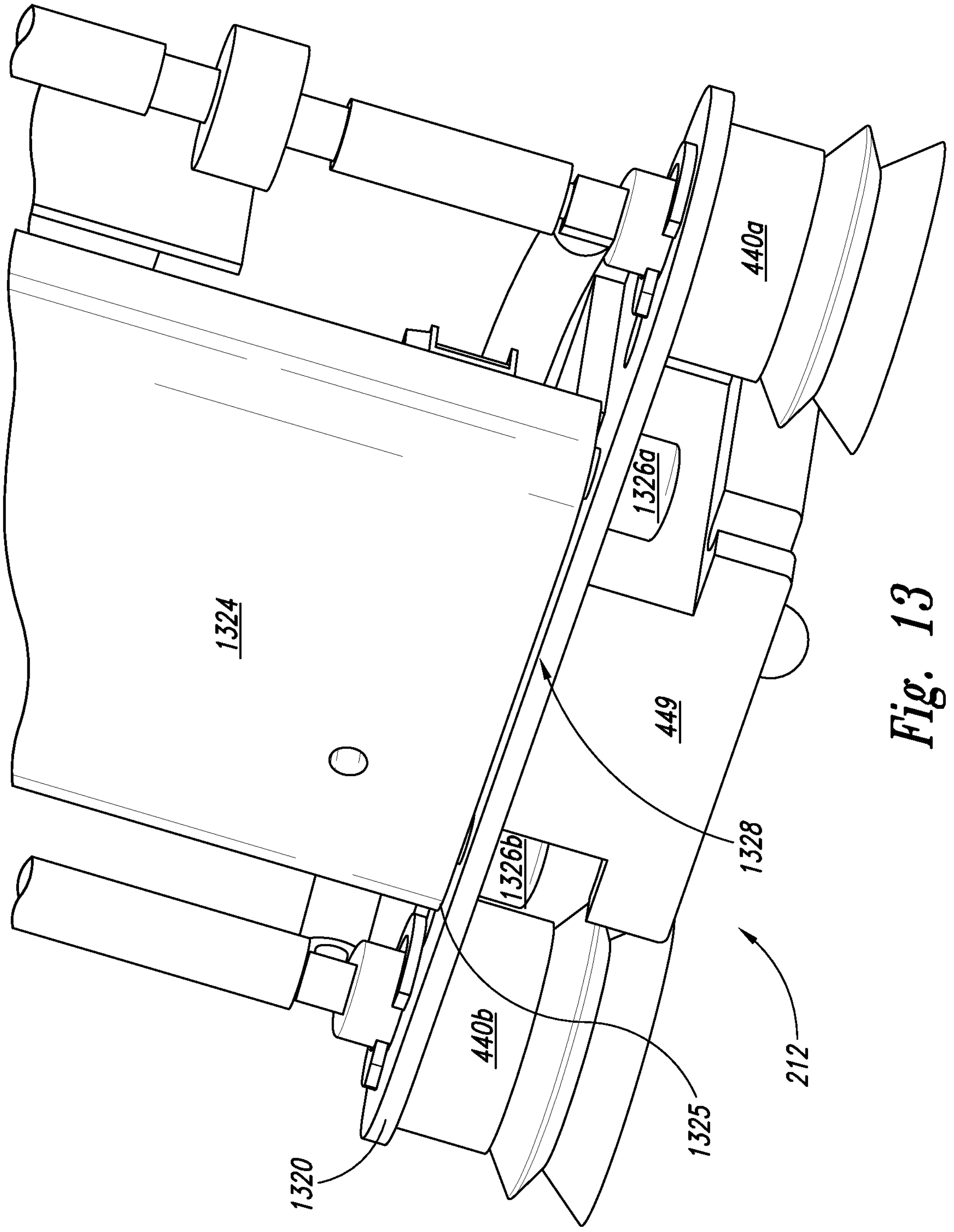
FIG. 13 is a rear view of a card carrier having a gimballing card selector head configured in accordance with an embodiment of the disclosure.

FIG. 13 is a rear view of the card selector head 212 described above with reference to FIG. 4. In one aspect of this embodiment, the suction cups 440 are mounted to a support plate 1320 that is pivotally attached to a vertical support member 1324. The vertical support member 1324 is fixedly coupled to the rack 314 (FIG. 3). In the illustrated embodiment, the support plate 320 is pivotally attached to a bottom surface 1325 of the vertical support member 1324 with a first fastener 1326*a* and a second fastener 1326*b*. The fasteners 1326 are configured to provide a gap 1328 between the support plate 1320 and the bottom surface 1325. Moreover, the fasteners 1326 pass through oversized holes (not shown) in the support plate 1320 that, in combination with the gap 1328, enable the support plate 1320 to gimbal or pivot slightly about both the X and Y axes (FIG. 4) as needed for the suction cups 440 to properly align and adhere to a card that may not be perfectly level.

Gift cards, credit cards, debit cards, phone cards, etc. often have a thin sticker (e.g., approximately 0.003 inch thick) concealing a PIN number or other indicia. Unfortunately, this sticker can cause the cards to stack unevenly. Other card features, such as raised lettering (embossing), surface printing, and/or graphic silk screening can also cause cards to stack unevenly. As a result, the top card in the stack may not be level; that is, the top card may not be aligned with a horizontal plane, and instead may be tilted. This is typically not a problem for card dispensers that feed cards from the bottom of the stack. The card dispensing apparatus 200 described in detail above, however, pulls cards from the top of the stack. In this type of card dispensing apparatus, uneven card stacks can impair the ability of the suction cups 440 on the selector head 212 (FIG. 4) to properly contact and attach to the top card.

Figure 14A:
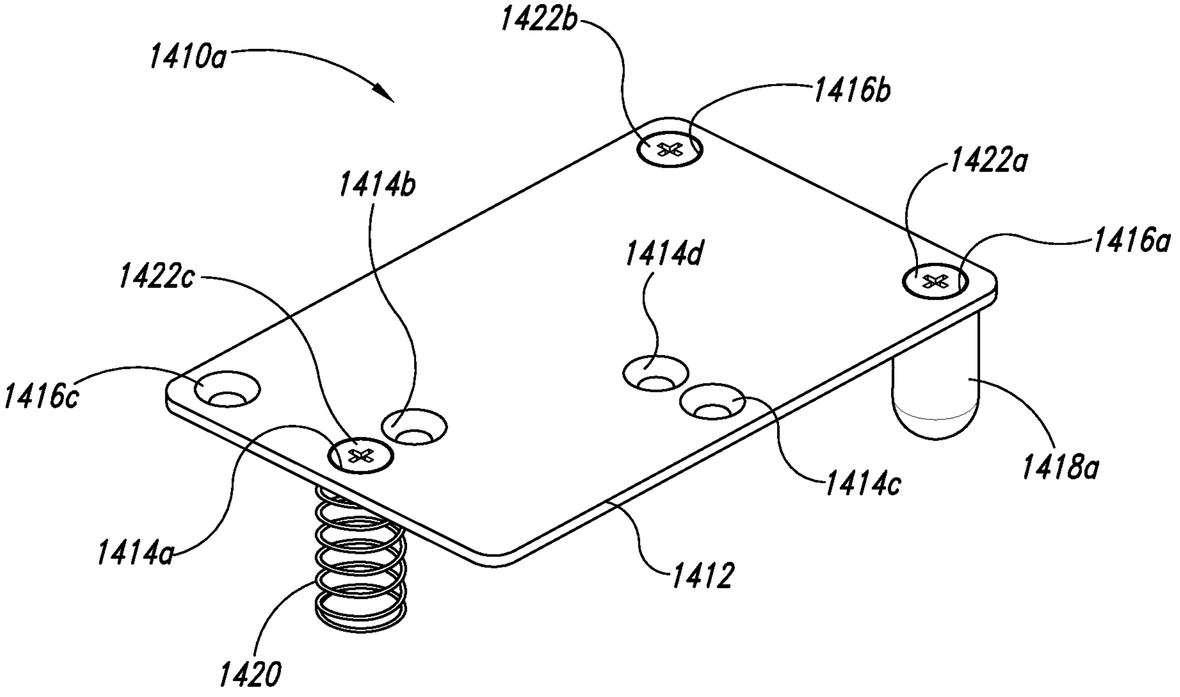
FIGS. 14A-14D are series of isometric views of a card stack leveling device configured in accordance with an embodiment of the disclosure.
Figure 14B:
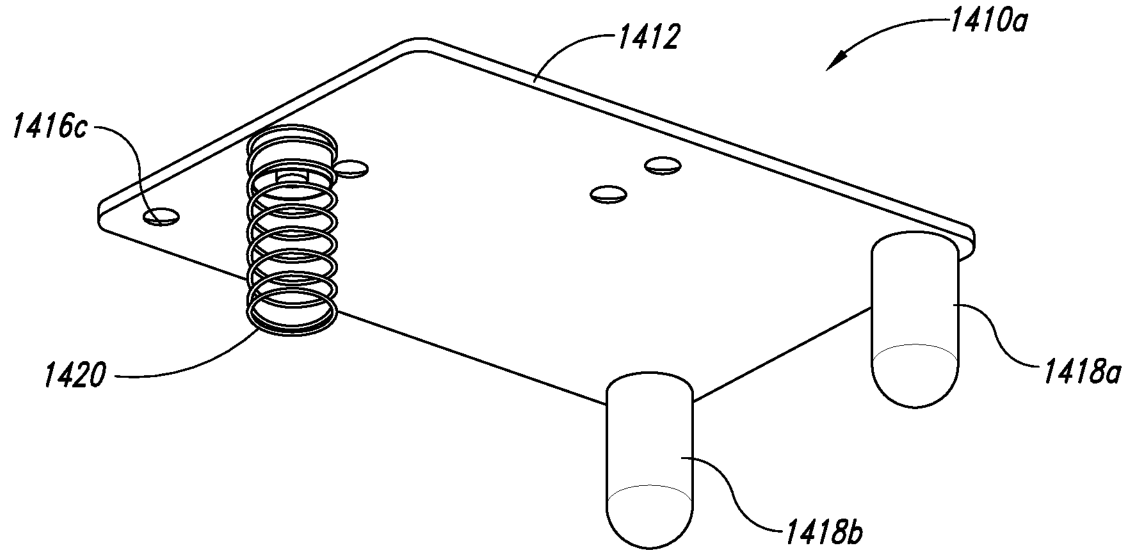

FIGS. 14A-14D are a series of isometric views illustrating two embodiments of a card stack leveling device 1410 configured in accordance with the present disclosure. More particularly, FIGS. 14A and 14B are top and bottom isometric views, respectively, of a first embodiment of the card stack leveling device 1410, referred to herein as a first leveling device 1410*a*. The first leveling device 1410*a* includes a base plate 1412 shaped and sized to fit in the bottom of a card hopper beneath a stack of cards. A pair of legs 1418 (identified individually as a first leg 1418*a* and a second leg 1418*b*) extend downwardly from one end portion of the base plate 1412, and a resilient member or spring 1420 (e.g., a coil spring) extends downwardly from an opposite end portion of the base plate 1412. In one embodiment, each of the legs 1418 can have a first length, and the spring 1420 can have a second length in an uncompressed state that is at least approximately equal to the first length. As described in more detail below, the legs 1418 and the spring 1420 form a three point support system that enables the leveling device 1410*a* to tilt downwardly about the legs 1418 when the spring 1420 is compressed by an uneven card stack.

In the illustrated embodiment, the legs 1418 are secured to the base plate 1412 by fasteners 1422 (e.g., flush-head screws) which extend through corresponding apertures 1416 (identified individually as a first leg aperture 1416*a* and a second leg aperture 1416*b*). The first and second leg apertures 1416*a, b* are positioned along one of the short edges of the base plate 1412. The base plate 1412 can additionally include a third leg aperture 1416*c* positioned opposite the first leg aperture 1416*a*. As described in more detail below, this enables the first leg 1418*a* to be moved to the opposite corner of the base plate 1412 so that the leveling device 1410*a* tilts downwardly about a long edge of the base plate 1412 instead of a short edge.

In the illustrated embodiment, the spring 1420 is secured to the base plate 1412 by a third fastener 1422*c* which extends through a first spring aperture 1414*a*. Like the legs 1418 described above, the spring 1420 can also be mounted to the base plate 1412 in a number of different positions to tailor the direction and angle of tilt of the leveling device 1410*a*. For example, when the first leg 1418*a* is installed in the third leg aperture 1416*c*, the spring 1420 can be moved to a third spring aperture 1414*c*. Moreover, the spring 1420 can also be secured to the base plate 1412 at one of two inner spring apertures 1414*b* and 1414*d*. Because the inner spring apertures 1414*b* and 1414*d* are positioned closer to the legs 1418 than the outer spring apertures, they allow greater tilt of the base plate 1412 for a given card stack.

Figure 14C:
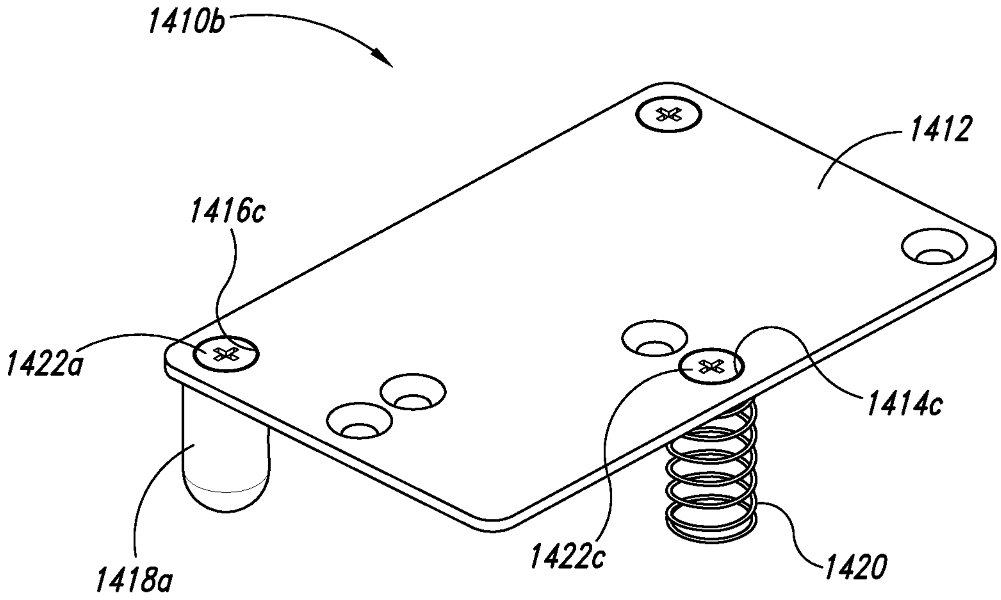
Figure 14D:
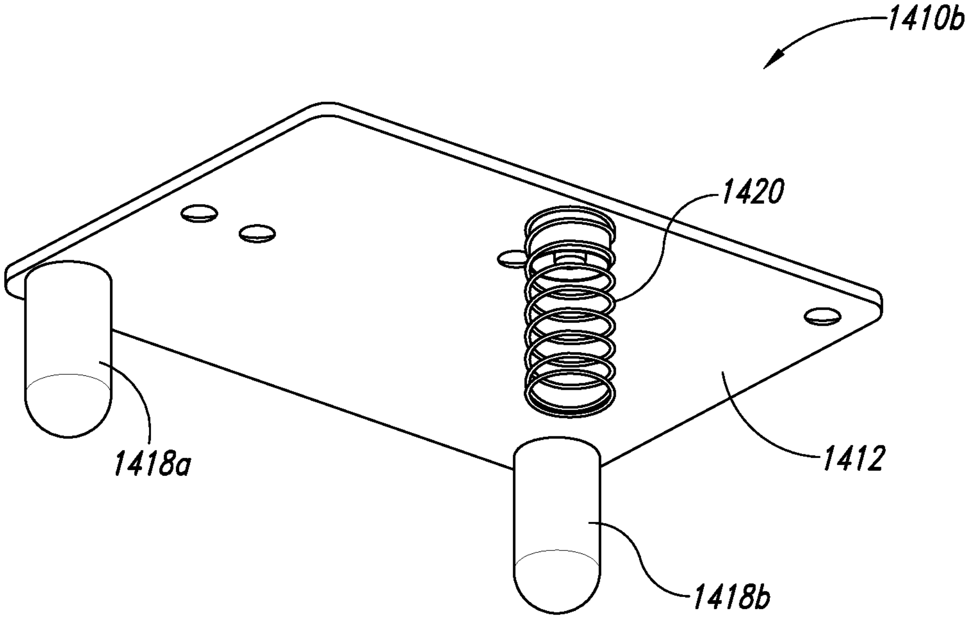

FIGS. 14C and 14D are top and bottom isometric views, respectively, of a second embodiment of the card stack leveling device 1410, referred to herein as a second leveling device 1410*b*. The second leveling device 1410*b* is formed by moving the first leg 1418*a* from the first leg aperture 1416*a* to the third leg aperture 1416*c*, and moving the spring 1420 from the first spring aperture 1414*a* to the third spring aperture 1414*c*. As discussed above, the plurality of leg apertures 1416 and spring apertures 1414 enable the magnitude and direction of tilt of the leveling device 1410 to be tailored based on the particular card load and/or the extent of non-uniform card thickness. Moreover, the spring force (or spring constant) of the spring 1420 can also be selected to accommodate the weight of a particular card stack and/or the severity of tilt resulting from the thickness variations of the cards. In one embodiment, for example, the spring rate can be selected to maintain the levelness or alignment of a top card in a stack at the point where the stack causes the spring 1420 to reach maximum compression. As cards are removed from the stack, the load on the spring is reduced and the base plate 1412 raises a small amount on the spring side. This slight rise accounts for the loss of the top card and causes the new top card in the stack to move toward a more level orientation.

Some PIN code stickers and/or other features that increase local card thickness may not be centered along the long or short edge of a card, but instead may be located somewhere in between these two positions. This may cause a stack of the cards to tilt about both the long and short axes (i.e., the X and Y axes) of the cards. The card leveling device 1410 described herein can be used to accommodate such card stacks, but the leveling device 1410 may require a single pivot leg and/or one or more springs of the same or different spring rates placed at specific locations tailored to accommodate the specific type of card.

Figure 15C:
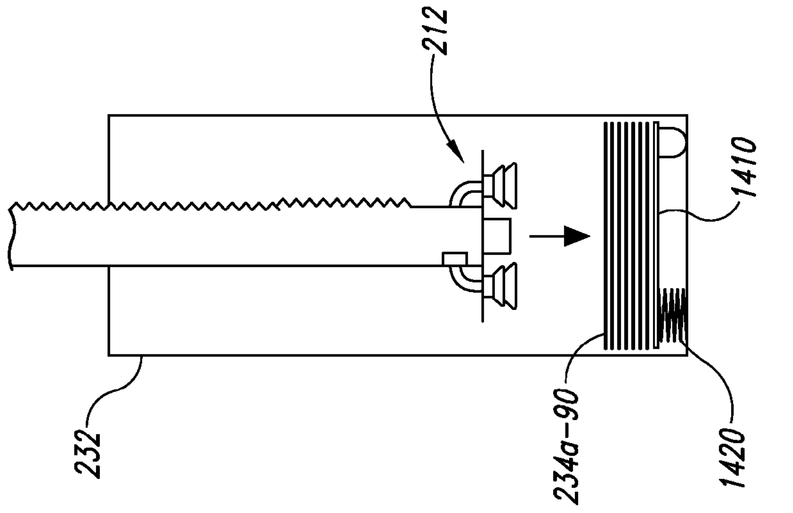
FIGS. 15A-15C are a series of side elevation views of the card stack leveling device of FIGS. 14A-14D positioned in the bottom of a card hopper beneath a stack of cards of uneven thickness.
Figure 15B:
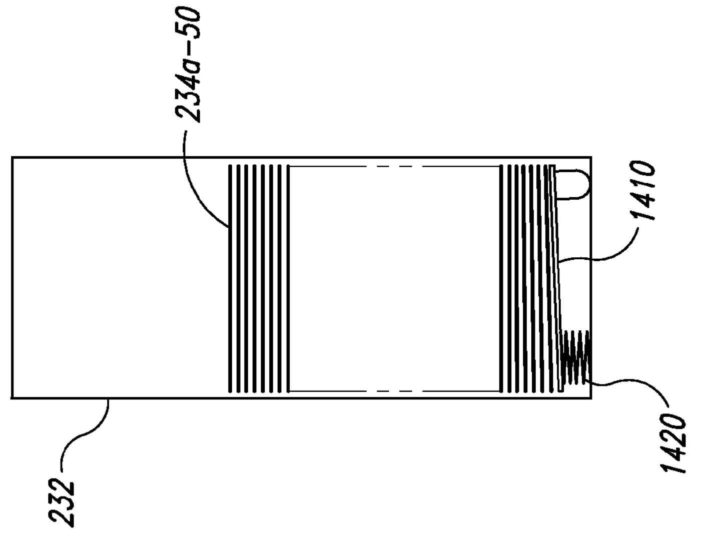
Figure 15A:
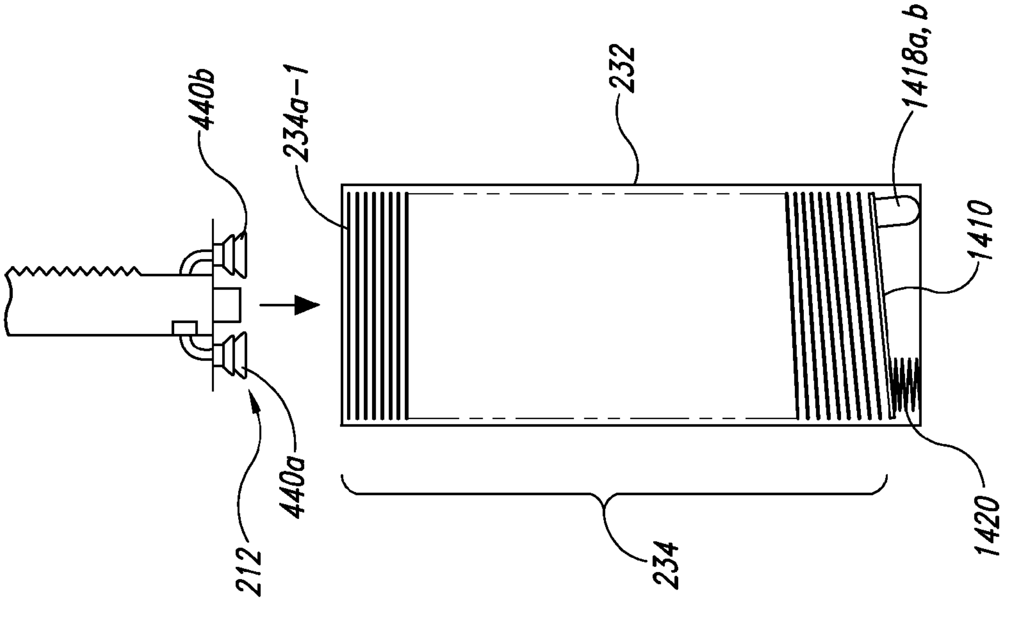

FIGS. 15A-15C are a series of schematic side views showing the card stack leveling device 1410 positioned in the bottom of a card hopper 232 beneath a stack of cards 234 that gets progressively smaller. In FIG. 15A, the card hopper 232 is approximately full of the cards 234; in FIG. 15B the card hopper 232 is approximately half full of the cards 234; and in FIG. 15C the card hopper 232 is almost empty of the cards 234. The individual cards 234 can include a sticker (not shown) or other feature that causes the cards 234 to stack unevenly, with the total amount of tilt being proportional to the number of cards in the stack. Accordingly, in FIG. 15A the spring 1420 on the leveling device 1410 is fully, or near fully compressed. The compression of the spring 1420 causes the base plate 1412 to angle downwardly toward the spring 1420 and compensate for the non-uniform card thicknesses while still holding the top card $\mathbf{234}_{a\text{-}1}$ relatively level. Maintaining the top card $\mathbf{234}_{a\text{-}1}$ in a relatively level orientation helps the suction cups 440 on the card selector head 212 attach to the top card $\mathbf{234}_{a\text{-}1}$ and lift it out of the card hopper 232.

As the cards 234 are pulled from the card hopper 232 and dispensed, the reduction in weight allows the spring 1420 to begin expanding, thereby reducing the amount of tilt of the leveling device 1410. The reduction in tilt is at least approximately proportional to the reduced stack height, so that the new top card $\mathbf{234}_{a\text{-}50}$ remains relatively level. As shown in FIG. 15C, once almost all of the cards 234 have been removed from the hopper 232, the spring 1420 is almost fully expanded. As a result, the leveling device 1410 only has a slight amount of tilt. However, this slight amount of tilt is proportional to the relatively small number of cards 234 remaining in the hopper 232, so that the new top card $\mathbf{234}_{a\text{-}90}$ remains relatively level. Accordingly, the leveling device 1410 maintains the top most card 234*a* in a relatively level orientation regardless of the height of the card stack. This enables the suction cups 440 to seat flush against the card and quickly lift it from the hopper 232 regardless of the height of the card stack. Although the foregoing embodiments describe card stack leveling devices that can be placed in and removed from card hoppers, in other embodiments, other card hoppers can have similar card stack leveling devices built into them.

The foregoing description of embodiments of the invention is not intended to be exhaustive or to limit the invention to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative card vending systems described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the invention. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words “comprise,” “comprising,” and the like are to be construed in an inclusive sense as opposed to an exclusive or exhaustive sense; that is to say, in the sense of “including, but not limited to.” Words using the singular or plural number also include the plural or singular number respectively. Additionally, the words “herein,” “above,” “below,” and words of similar import, when used in this application, shall refer to this application as a whole and not to any particular portions of this application. When the claims use the word “or” in reference to a list of two or more items, that word covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. Accordingly, the inventors reserve the right to add claims after filing the application to pursue such additional claim forms for other aspects of the invention. Accordingly, the scope of the present invention is not limited, except by the appended claims.

We claim:

1. A method of monitoring a card stack in an enclosure, the enclosure containing a card dispensing apparatus operably positioned proximate the card stack, the method comprising:

determining a height of the card stack a first time with the card dispensing apparatus;

determining the height of the card stack a second time with the card dispensing apparatus;

comparing the height of the card stack determined the first time to the height of the card stack determined the second time; and when the height of the card stack determined the first time is different than the height of the card stack determined the second time, transmitting information related to the card stack to a remote computer, wherein when the height of the card stack determined the first time is greater than the height of the card stack determined the second time, transmitting information includes transmitting a message to the remote computer indicating that one or more cards have been removed from the card stack without being purchased.

2. The method of claim 1 wherein when the height of the card stack determined the first time is less than the height of the card stack determined the second time, transmitting information includes transmitting a message to the remote computer indicating that one or more cards have been added to the card stack.

3. The method of claim 1 wherein determining the height of the card stack a second time includes determining the height after a selected event, but prior to dispensing a card from the card stack.

4. The method of claim 3 wherein the selected event is the passage of a preset period of time.

5. The method of claim 3 wherein the selected event is receiving a request to dispense a selected card from the card stack, and wherein the method further comprises removing the selected card form the card stack and dispensing the selected card from the enclosure.

6. The method of claim 1 wherein the card dispensing apparatus includes a stepper motor that drives a card selector into a card hopper holding the card stack, and wherein determining the height of the card stack the first time includes counting the steps of the stepper motor to bring the card selector into contact with a top card in the card stack.

7. The method of claim 1 wherein the method further comprises prior to determining a height of the card stack a first time, removing the selected card from the card stack, reading the selected card, and placing the selected card back in the card stack.

8. A method of monitoring a card stack in an enclosure, the enclosure containing a card dispensing apparatus operably positioned proximate the card stack, the method comprising:

determining a height of the card stack a first time with the card dispensing apparatus;

determining the height of the card stack a second time with the card dispensing apparatus;

comparing the height of the card stack determined the first time to the height of the card stack determined the second time; and when the height of the card stack determined the first time is different than the height of the card stack determined the second time, transmitting information related to the card stack to a remote computer, wherein when the height of the card stack determined the first time is greater than the height of the card stack determined the second time, transmitting information includes transmitting a message to the remote computer indicating that one or more cards have been manually removed from the card stack without using the card dispensing apparatus.

9. The method of claim 8 wherein when the height of the card stack determined the first time is less than the height of the card stack determined the second time, transmitting information includes transmitting a message to the remote computer indicating that one or more cards have been added to the card stack.

10. The method of claim 8 wherein determining the height of the card stack a second time includes determining the height after a selected event, but prior to dispensing a card from the card stack.

11. The method of claim 10 wherein the selected event is the passage of a preset period of time.

12. The method of claim 10 wherein the selected event is receiving a request to dispense a selected card from the card stack, and wherein the method further comprises removing the selected card form the card stack and dispensing the selected card from the enclosure.

13. The method of claim 8 wherein the card dispensing apparatus includes a stepper motor that drives a card selector into a card hopper holding the card stack, and wherein determining the height of the card stack the first time includes counting the steps of the stepper motor to bring the card selector into contact with a top card in the card stack.

14. The method of claim 8 wherein the method further comprises prior to determining a height of the card stack a first time, removing the selected card from the card stack, reading the selected card, and placing the selected card back in the card stack.

15. A computer-implemented method of dispensing cards from an enclosure, the method comprising:

placing a stack of cards in a card hopper in the enclosure, wherein the stack of cards includes a first card to be dispensed from the enclosure;

before dispensing the first card from the enclosure:

temporarily removing the first card from the card hopper;

reading identification information from the first card; and placing the first card back in the hopper;

storing the identification information in memory;

receiving a request to dispense the first card;

in response to receiving the request:

removing the first card from the stack of cards; and dispensing the first card from the enclosure;

retrieving the identification information from memory; and sending the identification information to a remote computer to activate an account associated with the first card.

16. The method of claim 15:

wherein reading identification information from the first card includes moving the first card past a card reader spaced apart from the card hopper; and wherein placing the first card back in the stack of cards includes placing the first card back in the card hopper.

17. The method of claim 15 wherein placing the stack of cards in the card hopper in the enclosure includes placing a first stack of cards in a first card hopper, wherein the method further comprises:

placing a plurality of additional card stacks in additional card hoppers;

temporarily removing a top card from each of the additional card stacks;

reading identification information from each of the top cards; and placing each of the top cards back in their respective card stack.

18. The method of claim 15 wherein the method further comprises measuring a stack height of the card stack in response to receiving the request for the first card.

19. The method of claim 15 wherein the method further comprises:

measuring a stack height of the card stack at a first time before dispensing the first card; and in response to receiving the request to dispense the first card:

measuring a stack height of the card stack at a second time; and comparing the stack height measured the first time to the stack height measured the second time.

* * * * *